(12) United States Patent
Kim et al.

(10) Patent No.: US 12,530,443 B2
(45) Date of Patent: *Jan. 20, 2026

(54) METHOD AND APPARATUS WITH SELECTIVE COMBINED AUTHENTICATION

(71) Applicant: Samsung Electronics Co., Ltd., Suwon-si (KR)

(72) Inventors: Jihye Kim, Anyang-si (KR); Seungju Han, Seoul (KR); Jaejoon Han, Seoul (KR); Minsu Ko, Suwon-si (KR); SungUn Park, Suwon-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,512

(22) Filed: Apr. 10, 2023

(65) Prior Publication Data

US 2023/0252120 A1  Aug. 10, 2023

Related U.S. Application Data

(63) Continuation of application No. 16/269,990, filed on Feb. 7, 2019, now Pat. No. 11,625,473.

(30) Foreign Application Priority Data

Feb. 14, 2018  (KR) ........................ 10-2018-0018666
Mar. 12, 2018  (KR) ........................ 10-2018-0028707
Aug. 13, 2018  (KR) ........................ 10-2018-0094439

(51) Int. Cl.
*G06F 21/40* (2013.01)
*G06F 18/25* (2023.01)
(Continued)

(52) U.S. Cl.
CPC ............ *G06F 21/40* (2013.01); *G06F 18/256* (2023.01); *G06F 21/32* (2013.01); *G06F 21/45* (2013.01);
(Continued)

(58) Field of Classification Search
CPC ........ G06F 21/40; G06F 21/32; G06F 18/256; G06F 21/45; H04L 9/3231;
(Continued)

(56) References Cited

U.S. PATENT DOCUMENTS 9,430,629 B1    8/2016  Ziraknejad et al.
10,248,771 B1 *  4/2019  Ziraknejad .......... H04L 63/0861
(Continued)

FOREIGN PATENT DOCUMENTS

CN    101872413 A    10/2010
CN    107294730 A    10/2017
(Continued)

OTHER PUBLICATIONS

Vishi et al. "Multimodal Biometric Authentication Using Fingerprint and Iris Recognition in Identity Management" *2013 Ninth International Conference on Intelligent Information Hiding and Multimedia Signal Processing. IEEE*, 2013 (pp. 334-341).
(Continued)

*Primary Examiner* — Victor Lesniewski
(74) *Attorney, Agent, or Firm* — NSIP Law

(57) ABSTRACT

A method and apparatus with selective combined authentication performs a single authentication based on a first modality among plural modalities, and in response to the single authentication having failed, determines whether to perform a combined authentication by a combination of two or more of the plural modalities, and selectively, depending
(Continued)

on a result of the determining of whether to perform the combined authentication, performs the combined authentication.

17 Claims, 18 Drawing Sheets

(51) Int. Cl.
| | |
|---|---|
| *G06F 21/32* | (2013.01) |
| *G06F 21/45* | (2013.01) |
| *G06V 10/80* | (2022.01) |
| *G06V 40/70* | (2022.01) |
| *H04L 9/32* | (2006.01) |
| *H04L 9/40* | (2022.01) |
| *G06F 21/36* | (2013.01) |
| *G06V 40/12* | (2022.01) |
| *G06V 40/14* | (2022.01) |
| *G06V 40/16* | (2022.01) |
| *G06V 40/18* | (2022.01) |
| *G06V 40/30* | (2022.01) |

(52) U.S. Cl.
CPC ............ *G06V 10/811* (2022.01); *G06V 40/70* (2022.01); *H04L 9/3231* (2013.01); *H04L 63/0853* (2013.01); *H04L 63/0861* (2013.01); *G06F 21/36* (2013.01); *G06V 40/1365* (2022.01); *G06V 40/14* (2022.01); *G06V 40/172* (2022.01); *G06V 40/197* (2022.01); *G06V 40/30* (2022.01); *H04L 2463/082* (2013.01)

(58) Field of Classification Search
CPC ............ H04L 63/0861; H04L 63/0853; G06V 10/811; G06V 40/70
See application file for complete search history.

(56) References Cited

U.S. PATENT DOCUMENTS

| | | | |
|---|---|---|---|
| 10,404,465 B2 | 9/2019 | Takahashi | |
| 2002/0184538 A1 | 12/2002 | Sugimura et al. | |
| 2003/0051147 A1 | 3/2003 | Madea et al. | |
| 2004/0039909 A1* | 2/2004 | Cheng ...................... | G07C 9/22 713/169 |
| 2004/0153656 A1 | 8/2004 | Cluts et al. | |
| 2006/0171571 A1 | 8/2006 | Chan et al. | |
| 2008/0101658 A1 | 5/2008 | Ahern et al. | |
| 2009/0150320 A1 | 6/2009 | Geppert | |
| 2009/0310779 A1 | 12/2009 | Lam et al. | |
| 2010/0245556 A1 | 9/2010 | Kanda et al. | |
| 2013/0267204 A1 | 10/2013 | Schultz et al. | |
| 2013/0326229 A1 | 12/2013 | Eguchi | |
| 2014/0112553 A1 | 4/2014 | Yamaguchi | |
| 2014/0289833 A1 | 9/2014 | Briceno et al. | |
| 2014/0337945 A1 | 11/2014 | Jia et al. | |
| 2015/0242601 A1 | 8/2015 | Griffiths et al. | |
| 2016/0087957 A1 | 3/2016 | Shah et al. | |
| 2016/0119555 A1 | 4/2016 | Saylor et al. | |
| 2016/0135046 A1 | 5/2016 | John Archibald et al. | |
| 2016/0149906 A1 | 5/2016 | Yamada | |
| 2016/0269178 A1 | 9/2016 | Yang et al. | |
| 2016/0308859 A1 | 10/2016 | Barry et al. | |
| 2016/0359838 A1 | 12/2016 | Dasgupta et al. | |
| 2017/0039357 A1 | 2/2017 | Hwang et al. | |
| 2017/0093849 A1* | 3/2017 | Wang ..................... | A61B 5/742 |
| 2017/0286648 A1 | 10/2017 | Yamaguchi et al. | |
| 2018/0012006 A1 | 1/2018 | Suh et al. | |
| 2018/0014195 A1 | 1/2018 | John Archibald et al. | |
| 2018/0046853 A1 | 2/2018 | Ionita | |
| 2018/0082297 A1 | 3/2018 | Bacastow | |
| 2018/0130475 A1 | 5/2018 | Page et al. | |
| 2018/0173863 A1* | 6/2018 | Andersson ............. | G06V 40/70 |
| 2020/0151988 A1* | 5/2020 | Harding ................... | G07C 9/37 |
| 2024/0015151 A1* | 1/2024 | Alexanian ............... | G06F 18/22 |

FOREIGN PATENT DOCUMENTS

| | | |
|---|---|---|
| CN | 107463818 A | 12/2017 |
| CN | 107465809 A | 12/2017 |
| JP | 2005-242677 A | 9/2005 |
| JP | 2005-339425 A | 12/2005 |
| KR | 10-1276345 B1 | 6/2013 |
| KR | 10-1890717 B1 | 8/2018 |

OTHER PUBLICATIONS

Ghayoumi et al. "A review of multimodal biometric systems: Fusion methods and their applications" *2015 IEEE/ACIS 14th International Conference on Computer and Information Science (ICIS).* IEEE, 2015. (pp. 131-136).

Jamdar et al. "Implementation of unimodal to multi modal biometric feature level fusion of combining face iris and ear in multi-modal biometric system" *2017 International Conference on Trends in Electronics and Informatics (ICEI),* 2017 (pp. 625-629).

Evangelin et al. "Feature level fusion approach for personal authentication in multi modal biometrics," *2017 Third International Conference on Science Technology Engineering & Management (ICON STEM),* 2017 (pp. 148-151).

Partial European Search Report issued on May 9, 2019 in counterpart European Patent Application No. 19156716.3 (14 pages in English).

Chinese Office Action issued on Aug. 1, 2024, in counterpart Chinese Patent Application No. 201910114390.8 (25 pages in English, 16 pages in Chinese).

Chinese Office Action issued on Dec. 13, 2024, in counterpart Chinese Patent Application No. 201910114390.8 (27 pages in English, 17 pages in Chinese).

Chinese Office Action issued on Aug. 30, 2025, in counterpart Chinese Patent Application No. 201910114390.8 (25 pages in English, 16 pages in Chinese).

\* cited by examiner

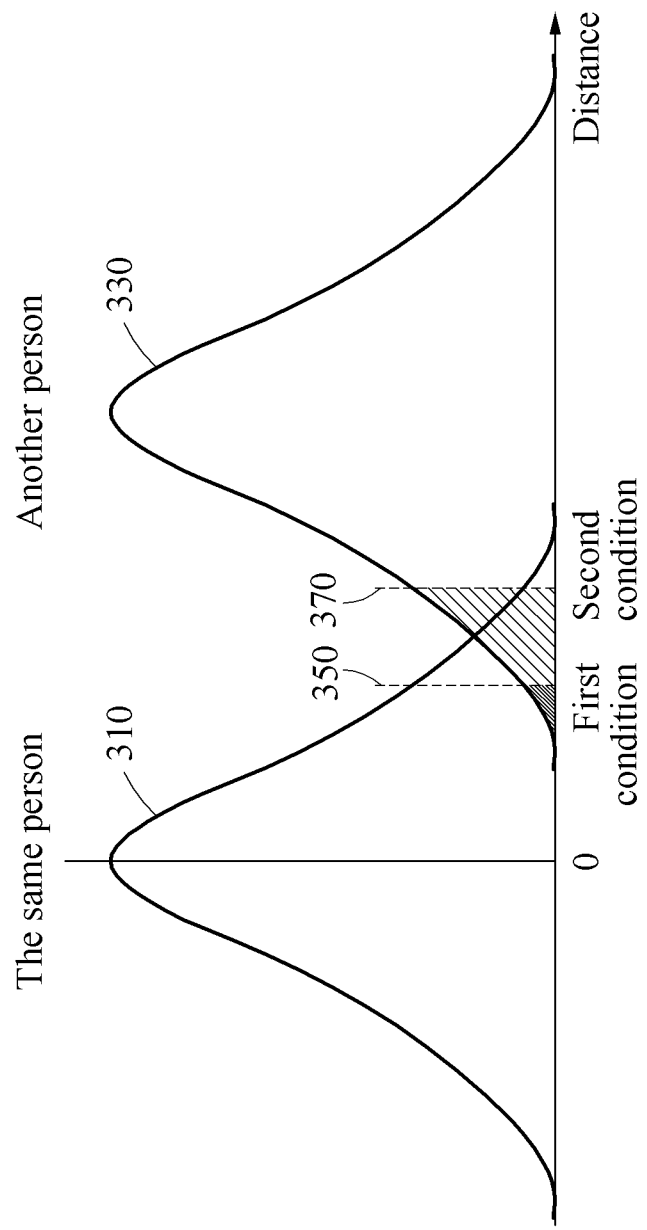

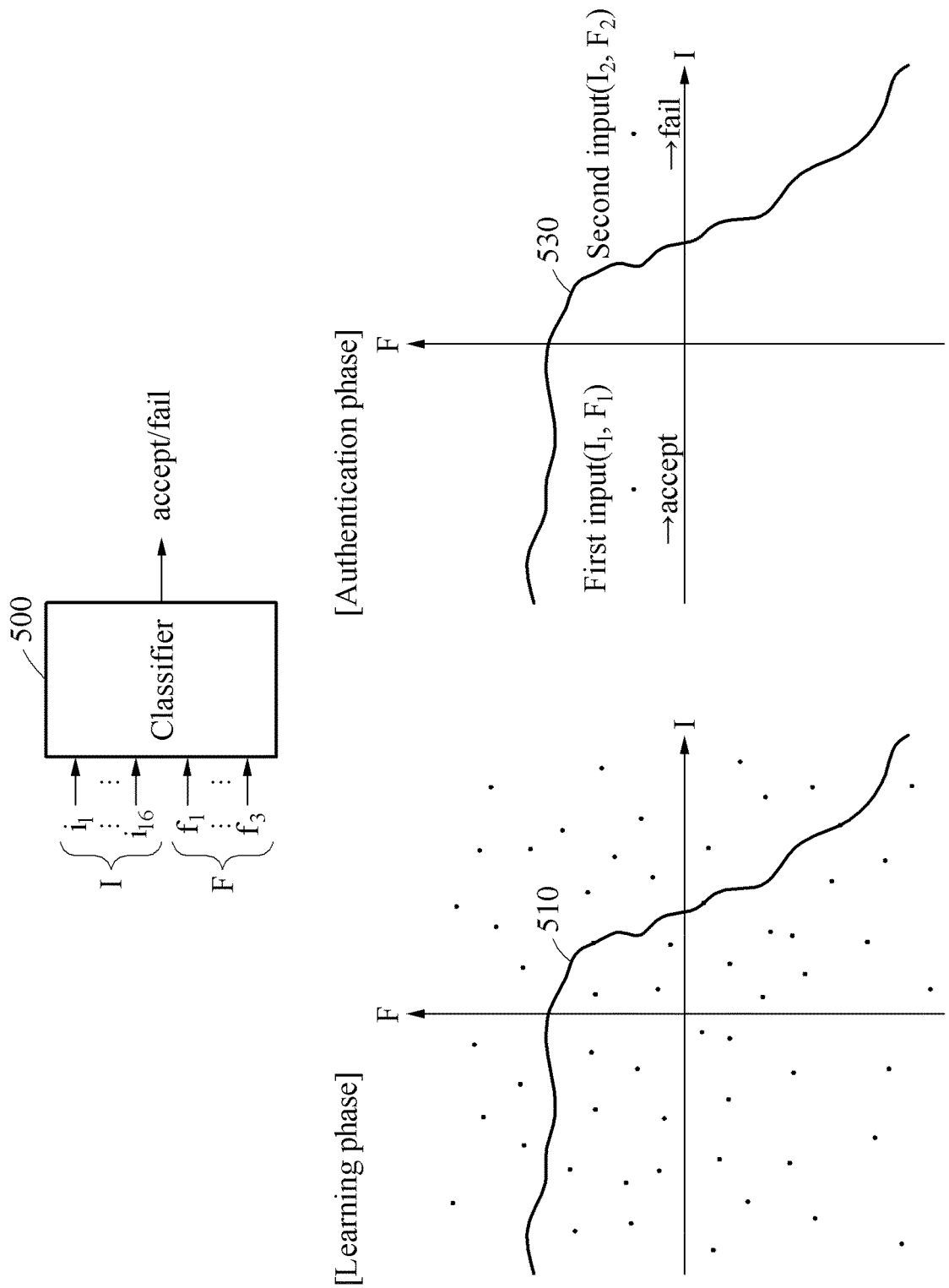

FIG. 13B

BIOMETRICS

1350 — Intelligent Scan
Combined face and iris scanning for better results.
Register your face and irises to use Intelligent Scan.

1370 — Face Recognition
Register your face.

1390 — Iris Scanner
Register your irises.

METHOD AND APPARATUS WITH SELECTIVE COMBINED AUTHENTICATION

CROSS-REFERENCE TO RELATED APPLICATIONS

This application is a continuation of U.S. application Ser. No. 16/269,990, filed on Feb. 7, 2019, now U.S. Pat. No. 11,625,473, which claims the benefit under 35 USC § 119(a) of Korean Patent Application No. 10-2018-0018666 filed on Feb. 14, 2018, Korean Patent Application No. 10-2018-0028707 filed on Mar. 12, 2018, and Korean Patent Application No. 10-2018-0094439 filed on Aug. 13, 2018 in the Korean Intellectual Property Office, the entire disclosures of all of which are incorporated herein by reference for all purposes.

BACKGROUND

1. Field

The following description relates to a method and apparatus for with selective combined authentication.

2. Description of Related Art

With the development of various mobile devices including smart phones, and user devices such as wearable devices, secure authentication is being implemented. Biometric recognition may provide a security level for a user device and enable a relative level of safe use of various application programs such as a mobile payment application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented authentication method includes performing a single authentication based on a first modality among plural modalities, and in response to the single authentication having failed, determining whether to perform a combined authentication by a combination of two or more of the plural modalities, and selectively, depending on a result of the determining of whether to perform the combined authentication, performing the combined authentication.

The determining of whether to perform the combined authentication may include determining whether a second condition for the combined authentication is satisfied, where the second condition may be different from a first condition determinative of success or failure of the single authentication.

The second condition may be determined differently for each different combination of the plural modalities.

The second condition may be determined based on a false acceptance rate (FAR) of a modality representing a highest security among the plural modalities.

The second condition may be determined based on a FAR of a modality representing a highest convenience among the plural modalities.

The performing of the single authentication may include determining whether a first feature of the first modality satisfies a first condition for the single authentication.

The determining of whether to perform the combined authentication may include determining whether a first feature of the first modality satisfies a second condition different from a first condition for the single authentication.

The performing of the combined authentication may include determining whether a result of the combined authentication satisfies a third condition different from the first and second conditions.

The two or more of the plural modalities may include the first modality and a second modality that is different from the first modality, and the determining of whether to perform the combined authentication may include determining whether a first feature of the first modality, a second feature of the second modality, or a combination of the first feature and the second feature satisfies a second condition different from a first condition for the single authentication.

The two or more of the plural modalities may include the first modality and a second modality, and where the performing of the combined authentication may include generating a third feature by fusing a first feature of the first modality and a second feature of the second modality, in response to a determination to perform the combined authentication as a result of the determining of whether to perform the combined authentication, and performing the combined authentication based on the third feature.

The performing of the combined authentication may include determining whether the third feature satisfies a third condition for the combined authentication.

The combination of the two or more of the plural modalities may be determined based on a determined security or a convenience level for the combined authentication.

The plural modalities may include any one or any combination of a face image modality, a fingerprint image modality, an iris image modality, a vein image modality, a palmprint image modality, a signature modality, a voice modality, a gait modality, and a DNA structure modality of a user. The two or more of the plural modalities may also be modalities selected by a user through a user interface for the authentication method. The method may further include selectively updating registration information of the user based on the modalities selected by the user.

In one general aspect, a processor-implemented authentication method includes determining whether to perform a combined authentication, considering a first modality and a second modality, based on any one or any combination of a first feature of the first modality and a second feature of the second modality, and selectively, based on a result of the determining, performing the combined authentication based on the first feature and the second feature.

The first and second modalities may be different modalities of plural modalities that may include a face image modality, a fingerprint image modality, an iris image modality, a vein image modality, a palmprint image modality, a signature modality, a voice modality, a gait modality, and/or a DNA structure modality of a user.

The performing of the combined authentication may include generating a third feature by fusing the first feature and the second feature, and performing the combined authentication based on the third feature.

The performing of the combined authentication based on the third feature may include determining whether the third feature satisfies a third condition for the combined authentication.

The determining may include determining whether the first feature, the second feature, or a combination of the first feature and the second feature satisfies a second condition different from a first condition for a performed single authentication that is based on the first modality or the second modality, and determining to perform the combined authentication in response to the second condition being satisfied.

The second condition may be determined based on a first false acceptance rate (FAR) of the first modality, a second FAR of the second modality, or a combination of the first FAR and the second FAR.

In one general aspect, a processor implemented authentication method includes determining whether a first entry condition corresponding to a first combination of plural modalities is satisfied, selectively, depending on a result of the determining of whether the first entry condition is satisfied, performing an authentication by the first combination, and in response to the authentication by the first combination having failed, determining whether a second entry condition corresponding to a second combination of the plural modalities is satisfied, and selectively, depending on a result of the determining of whether the second entry condition is satisfied, performing an authentication by the second combination.

The first entry condition and the second entry condition may be respectively determined differently for each of the first combination of the plural modalities and the second combination of the plural modalities.

The determining of whether the first entry condition is satisfied may include determining whether the first entry condition is satisfied based on whether the first combination of the plural modalities satisfies a second condition that may be different from a first condition for a performed single authentication of a modality of the plural modalities.

The first combination of the plural modalities may include a first modality and a second modality that may be different from the first modality, and the determining of whether the first entry condition is satisfied may include determining whether any one or any combination of a first feature of the first modality and a second feature of the second modality satisfies the second condition, and determining that the first entry condition is satisfied in response to the second condition being satisfied.

In one general aspect, a processor implemented authentication method includes performing a single authentication based on a first modality among plural modalities, and selectively, dependent on the single authentication having failed, performing a combined authentication by a combination of the plural modalities.

The method may further include in response to the single authentication having failed, performing another single authentication based on a second modality among the plural modalities, and wherein the selective performing of the combined authentication may include determining whether to perform the combined authentication in response to the other single authentication having failed.

The performing of the combined authentication may include generating a third feature by fusing a first feature of the first modality and a second feature of a second modality among the plural modalities, and performing the combined authentication based on the third feature.

In one general aspect, a biometric authentication method of authenticating a user using a first biometric modality and a second biometric modality which are different from each other, includes determining whether biometric information of the user satisfies one of a first condition corresponding to a feature of the first biometric modality and a second condition corresponding to a feature of the second biometric modality, determining whether the biometric information of the user satisfies a combined condition, for a combined authentication, corresponding to the feature of the first biometric modality and the feature of the second biometric modality, and determining that the combined authentication is successful in response to a determination that the biometric information of the user satisfies one of the first condition and the second condition, and satisfies the combined condition.

The biometric authentication method may further include indicating that the user is authenticated in response to the biometric information satisfying the first condition or the second condition, and in response to the combined authentication being determined successful.

The biometric authentication method may further include determining whether the biometric information of the user satisfies another combined condition, for another combined authentication, corresponding to at least the feature of the first biometric modality and the feature of the second biometric modality, and determining that the other combined authentication is successful in response to a determination that the biometric information of the user satisfies the other combined condition.

The biometric authentication method may further include indicating that the user is authenticated in response to: the biometric information satisfying the first condition or the second condition, in response to the combined authentication being determined successful, and in response to the other combined authentication being determined successful.

The combined condition may be a condition corresponding to a feature resulting from a fusing of the feature of the first biometric modality and the feature of the second biometric modality.

The combined condition may be a condition combining a score calculated based on the feature of the first biometric modality and a score calculated based on the feature of the second biometric modality.

The determining of whether the biometric information of the user satisfies the combined condition may include generating a third feature by fusing the feature of the first biometric modality and the feature of the second biometric modality, where the combined condition corresponds to the third feature, and determining whether the combined condition corresponding to the third feature is satisfied.

The determining of whether the biometric information of the user satisfies the combined condition may include generating a third score by combining a first score calculated based on the feature of the first biometric modality and a second score calculated based on the feature of the second biometric modality, and determining whether the combined condition is satisfied based on the third score.

The first biometric modality may be an iris modality, and the second biometric modality may be a face modality.

In one general aspect, a mobile apparatus includes a processor, and a memory storing instructions, which when executed by the processor configure the processor to perform a single authentication based on a first modality among plural modalities, and in response to the single authentication having failed, determine whether to perform a combined authentication by a combination of two or more of the plural modalities, and selectively, depending on a result of the determining of whether to perform the combined authentication, perform the combined authentication.

Other features and aspects will be apparent from the following detailed description, the drawings, and the claims.

BRIEF DESCRIPTION OF THE DRAWINGS

FIGS. 3A and 3B illustrate an example of a first condition and a second condition.

FIG. 5 illustrates an example of an operation of a classifier that performs one or more selective combined authentications.

FIGS. 13A and 13B illustrate an example of a biometrics registration process.

Figure 1:
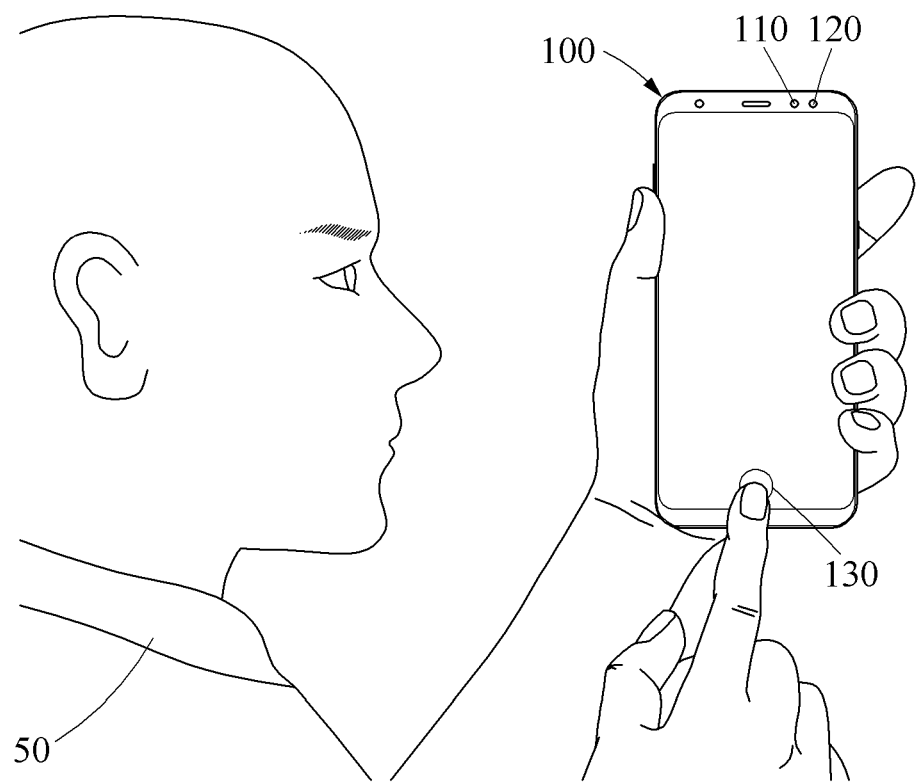
FIG. 1 illustrates an example of a method with selective combined authentication.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as first, second, A, B, (a), (b), and the like may be used herein to describe components, the components are not limited to the terms. In addition, each of these terminologies is not used to define an essence, order, or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components in an example embodiment, but do not preclude the presence or addition of one or more other features, integers, operations, elements, components, and/or groups thereof in alternative embodiments, nor the lack of such stated features, integers, operations, elements, components, and/or combinations/groups thereof in further alternative embodiments unless the context and understanding of the present disclosure indicates otherwise. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Examples set forth hereinafter include any of various types of products such as a personal computer, a laptop computer, a tablet computer, a smart phone, a television, a smart home appliance, an intelligent vehicle, a kiosk, and a wearable device. For example, the examples may be, or applied to, a smart phone, a mobile device, a smart home system, an intelligent vehicle, and an automated teller machine (ATM) for user authentication, and the apparatuses and methods demonstrated in the accompanying drawings are thereby representative of the same. Accordingly, the examples will be described in detail with reference to the accompanying drawings, wherein like drawing reference numerals are used for like elements.

FIG. 1 illustrates an example of a method with selective combined authentication. Referring to FIG. 1, a situation in which a user 50 performs a biometric recognition or authentication using an image sensor 110, an infrared (IR) sensor 120, or a fingerprint sensor 130 of a mobile device 100 is illustrated.

In an example, the biometric recognition or authentication may be performed selectively using a plurality of modalities based on various biometrics such as a face, an iris, a fingerprint, and a vein, as non-limiting examples. Thus, the term "modalities" refers to unique biometric information of a user such as, for example, a face, a fingerprint, an iris, a vein, a palmprint, a signature, a voice, a gait, and a DNA structure of the user, or various aspects that represent unique information that may then be used to verify, recognize, or authenticate, among other example functions, the user, noting that such modality examples are not intended to be limiting and alternative examples are also available.

When using various biometrics, the corresponding provided security level of the respective biometric authentication varies such verification, recognition, or authentication for each modality. For example, an authentication using an iris modality may have a false acceptance rate (FAR) of one ten-millionth, while respective authentications using a fingerprint modality and a face modality each may have a FAR of one millionth. The term "FAR", or false acceptance rate, refers to a rate of falsely verifying or misverifying biometric information of another person as biometric information of one person, a rate of falsely authenticating or misauthenticating biometric information of the person as biometric information of the one person, or a rate of falsely recognizing or misrecognizing biometric information of the other person as biometric information of the one person. Herein, such FARs of such verifying, authenticating, or recognizing using the respective modalities will be referred to as the respective FARs of the modalities, just as securities or security levels of such modalities are herein references to securities or security levels provided or made available by or by consideration of the corresponding modality. As a FAR of a modality with respect to corresponding biometric information decreases, a security, that is, a security level, of the modality increases.

In an example of using a combined authentication of performing a verification, recognition, or authentication through a combination of various modalities, a security may be improved of the respective separate modality provided securities by considering respective advantages and/or disadvantages of the modalities. For example, a combined authentication through the combination of the modalities may more confidently indicate accurate authentication performance suitable for various situations. Herein, while the terms verification, recognition, or authentication may have different meanings, e.g., with verification being a based on comparisons to a known class of persons and recognition or authentication being based on the same or consideration of greater or multiple classes or without pre-classification of persons, descriptions of examples with respect to any of such verification, recognition, or authentication should be understood to be applicable to all of such verification, recognition, and authentication examples.

In an example, a user may be selectively authenticated using an iris image and a face image. The iris image and the face image may be captured through an IR camera, a color camera, a monochrome camera, or a three-dimensional (3D) camera, as non-limiting examples. The 3D camera may include or be implemented as one or more respective various types of cameras such as a time-of-flight (ToF) camera and a structured light camera, noting that such types of 3D cameras are merely demonstrative examples and thus 3D camera examples herein are not limited thereto. In an example, the iris image may be captured through the IR camera or another type of camera, e.g., a color camera, configured to also capture IR information, while the face image is captured through the color camera, one or more other color cameras, or the example 3D camera. Thus, the iris image and the face image may be captured through various combinations of the above-mentioned cameras, as non-limiting examples.

The iris modality may have a higher security than the face modality. For example, if a user A and a user B are twins, consideration of the iris modalities of the respective user A and user B will result in different feature vectors, for example, similar to those of different non-twin persons. However, with respect to the face modality, considerations of face modalities of the respective example twin user A and user B will result in similar feature vectors, for example, at similar to those of a same person. Thus, it may be difficult to distinguish between twins based on the face modality, while it may be relatively easy to distinguish the twins based on the iris modality.

However, depending on an environment of capturing, the performance of iris modality may become lower than the performance of face modality. For example, the iris image may be captured using an IR sensor from reflected light emitted from a light emitting diode (LED) light included in a mobile device. However, under strong outdoor light including naturally occurring infrared light, the quality of the iris image degrades. For example, with such an iris modality as well as some or all other modalities, as the image quality degrades, the recognition performance decreases. Thus, in a case of using the iris modality only, the recognition performance may decrease in a specific environment, for example, in a situation in which strong outdoor light exists.

Rather, the quality of the face image does not typically degrade in the presence or environment of strong outdoor light. Thus, the recognition performance of face modality may not decrease even in a situation in which the recognition performance of iris modality decreases. However, unlike an example iris image, the example face image may be vulnerable to changes in type of environmental light or may vary depending on such different types of environmental light, such as a high luminance situation type compared to a low luminance situation type, and the example face image modality security or FAR may vary for different face poses or changes in face pose. Here, the term environment is meant to refer to the exterior of the camera through which incident light travels, e.g., where the environment is an outdoor environment the camera would be capturing incident light that is affected by light in the outdoor scene corresponding to the location of the camera. Similarly, references to an environment of low or high or strong indoor or outdoor light are references to the natural and/or artificial light sources in the surrounding of the camera that may produce light that may also be incident on the camera.

Thus, in an example, the iris image and the face image may be used combinedly or both considered, or selectively considered, to maintain a certain or desirable recognition performance in various situations or environments.

The examples set forth hereinafter should be understood as also including examples that consider both the security and the user convenience when performing a combined authentication by a combination of modalities. For example, examples may provide technology that improves the user convenience while maintaining the security, or technology that improves the security while maintaining the user convenience, as non-limiting examples.

In an example, security needs or desire may be considered more important for a payment application, e.g., compared to convenience or other needs or desires, and thus a scenario for performing a single authentication and a combined authentication may be set to be implemented to improve the user convenience while maintaining the security. For example, examples may primarily perform a single authentication using a modality having a relatively high security, for example, an iris modality, and perform a combined authentication through a combination of a plurality of modalities, for example, the iris modality and a face modality, in response to the primary authentication having failed, or a resulting score or confidence level of the primary authentication failing to meet the corresponding single modality success threshold. In such an example, if the primary authentication is successful, or the resulting score of confidence level meets the corresponding single modality success threshold, then the combined authentication may not be performed and the corresponding user may be authenticated. Similarly, the successful or failed authentication of the user may be determined by one or more of such combined authentications based on their respective meetings or non-meetings of corresponding success thresholds.

In another example, user convenience needs or desire may be considered more important for an unlock function of a smart phone, e.g., compared to security or other needs or desires, and thus a scenario for performing a single authentication and a combined authentication may be set to maintain or improve the security while maintaining the user convenience at a high level. For example, examples may primarily perform a single authentication using a modality having a relatively high convenience, for example, a face modality, and secondarily perform another single authentication using a modality having a different feature or biometric information from the modality used for the primary authentication, for example, an iris modality, in response to the primary authentication having failed, or a resulting score or confidence level of the primary authentication fails to meet the corresponding primary single modality success threshold. In response to the secondary authentication having also failed, or a resulting score or confidence level of the secondary authentication failing to meet the corresponding secondary single modality success threshold, one or more other combined authentications may be performed through various combinations of the plurality of modalities, for example, the face modality and the iris modality, may be performed. In such an example, if the primary authentication is successful, or the resulting score or confidence level meets the corresponding primary single modality success threshold, then the combined authentication may not be performed and the corresponding user may be authenticated, and if the primary authentication is unsuccessful but the secondary authentication is successful, or the resulting score of confidence level meets the corresponding secondary single modality success threshold, then the combined authentication may not be performed and the corresponding user may be authenticated. Similarly, with the failure of both the primary and secondary authentications, the successful or failed authentication of the user may be determined by one or more of such further combined authentications based on their respective meetings or non-meetings of corresponding success thresholds.

Thus, one or more or all included examples herein provide technology that together may satisfy a desired or determined, e.g., based on user selection or an example application program requirement, security and user convenience level or importance or balance by determining respective 'entry conditions' as to whether to perform one or more combined authentications prior to performing the corresponding combined authentications, i.e., the determination of whether to perform such a combined authentication can be performed prior to the performance of the combined authentication. Accordingly, such entry conditions may be predetermined, e.g., prior to the performance of the example primary or secondary example authentications, based on which modalities are included in the combination of modalities for the combined authentication, the type or category of application to which the combined authentication is being or going to be applied, and/or information indicated by such applications.

Thus, an entry condition to determine whether to perform the combined authentication may be a condition related to at least one of the modalities for the combined authentication. For example, the entry condition may include a first condition related to the face modality, a second condition related to the iris modality, and a combination of the first condition and the second condition.

In an example, the entry condition is a condition different from a reference condition to determine whether a single authentication using an individual modality is successful. For example, in a case in which the entry condition is related to at least the iris modality, the entry condition may require a lowered FAR compared to a FAR of the single authentication using the iris modality, e.g., thereby providing higher security than the single authentication using the iris modality.

In an example, the combined authentication is applied to a payment application. In this example, an entry condition that considers the security to be more important, e.g., more important than another application or function such as unlock operation or more important than user convenience, while also improving user convenience may be set. Thus, in such examples where security is more important but some user convenience still desired, the examples may determine a respective entry condition for determining whether to perform a corresponding one or more combined authentications based on, or primarily based on, one or more modalities having a relatively high security in the corresponding combined authentication, for example, the iris modality, and then perform the corresponding combined authentication through a combination of the plurality of modalities, for example, the iris modality and the face modality.

In another example, the combined authentication is applied to an unlock function of a smart phone. In this example, an entry condition that considers the user convenience to be more important, e.g., more important than another application of function such as the payment application or more important than security, while also improving security may be set. Thus, in such examples where user convenience is more important, the examples may determine a respective entry condition for determining whether to perform a corresponding one or more combined authentications based on, or primarily based on, a single modality, for example, the iris modality, the face modality, or a fingerprint modality, and then perform the combined authentication through a combination of the plurality of modalities, for example, the face modality, the fingerprint modality, and the iris modality.

As described below, an entry condition is set for use for determining whether to perform a combination of single modalities, e.g., after one or more authentication failures of respective single modalities, rather than being set to use for respectively determining whether to perform any one of the authentications using only a single modality. Further, when performing the combined authentication, a scheme of combining the plurality of modalities may be set in various manners in different examples.

As noted above, respective scores or other confidence indicators for each single authentication for a single modality may be determined, for example, such as in the forms of matching scores or distance scores, e.g., as distances between a feature vector corresponding to the single modality and a registered feature vector for a registered user. Likewise, for each combined authentication considering multiple modalities, similar respective scores or other confidence indicators may be determined. Thus, each of such matching scores correspond to a score representing how similar a registered frame, image, series of images, or other biometric information and an input frame, image, series of images, or other biometric information are to each other, that is, a similarity between such considered information, i.e., the respective frames, images, series of images, and biometric information. A low matching score indicates a low similarity between the considered information, and a high matching score indicates a high similarity between the considered information. The higher the matching score, the higher probability the mobile device 100 accepts an authentication of the user 50. For example, when the matching score meets, e.g., is equal or greater than, a matching score authentication threshold, the user 50 is authenticated. Further, as noted, such distance scores may correspond to a score representing a feature distance, for example, a Euclidean distance, between the registered frame, image, series of images, or other biometric information and the input frame, image, series of images, or other biometric information. A low distance score indicates a short feature distance between the considered information, e.g., with in a corresponding feature vector space, and a high distance score indicates a long feature distance between the considered information. Accordingly, the lower the distance score, the higher probability the mobile device 100 accepts an authentication of the user 50. For example, when the distance score meets, e.g., is equal or less than, a distinct score authentication threshold, the user 50 is authenticated.

As described above, one or more or all of such various examples provide technological improvements in computer functionality of at least improving a user convenience of accessing a device with more accurate recognitions with at least selective emphases between security and user convenience in various implementations, such as through more accurately guaranteeing a relatively high security through a selective combined authentication by a selective combination of modalities, such as compared to previous approaches that only performed user authentication using a single corresponding modality. In addition, one or more or all examples herein improve user convenience by maintaining the user recognition and authentication performance in various environments using various modalities.

Figure 2:
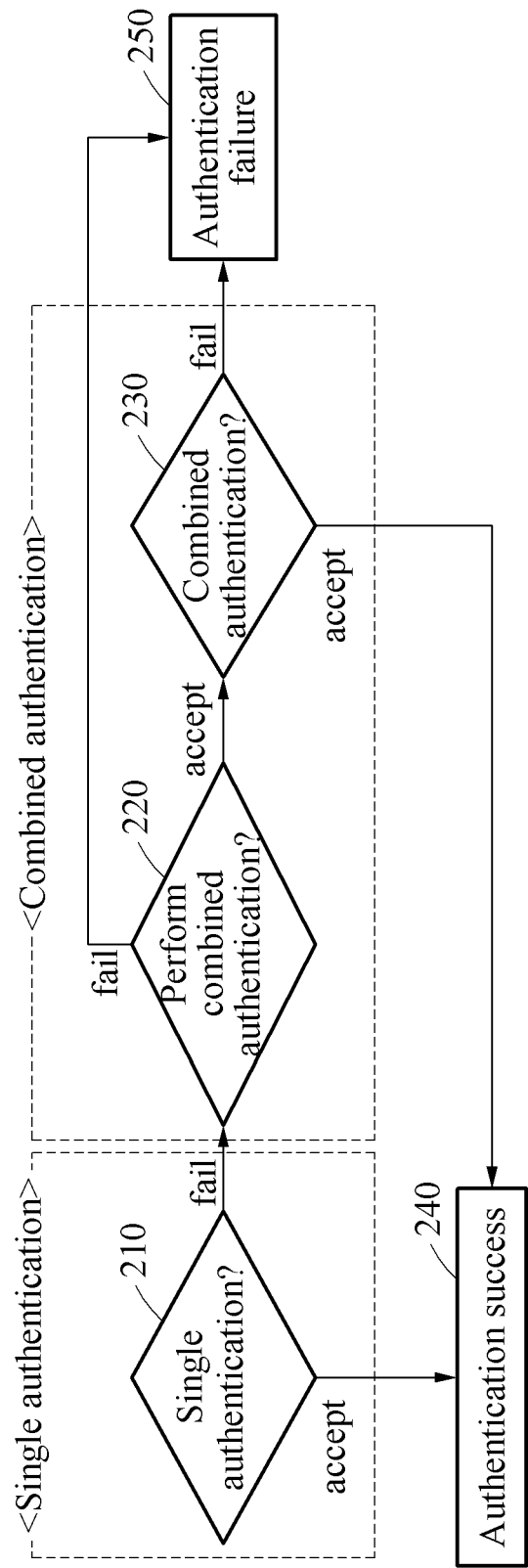
FIG. 2 is a flowchart illustrating an example of a method with selective combined authentication.

FIG. 2 is a flowchart illustrating an example of a method with selective combined authentication. Referring to FIG. 2, in operation 210, an apparatus with selective combined authentication, hereinafter, the "authentication apparatus", is configured to perform respective single authentications of individual corresponding modalities, and selectively performs one or more various combined authentications of respective multiple corresponding modalities in response to such one or more respective single authentications having failed. For example, the authentication apparatus may perform the single authentication by determining whether a first feature of a first modality satisfies a first condition. The first feature may be, for example, a Euclidean distance or a similarity or matching score determined based on feature vectors extracted from the first modality and stored feature vectors, for example. Further, the first condition may correspond to, for example, a threshold distance for the single authentication or a threshold score for the single authentication. In an example, the first condition for the single authentication may be determined or set differently based on the type of the modality, such as face, iris, palm, vein, or fingerprint respective modality types, as non-limiting example. In response to a result of the single authentication being that the corresponding condition is met in operation 210, i.e., that the authentication is a success, the authentication apparatus determines that the authentication of the user is successful, in operation 240.

In response to the single authentication having failed in operation 210, i.e., the corresponding condition not have been met, the authentication apparatus determines in operation 220 whether there is satisfaction of an entry condition, where the entry condition is determinative of whether the authentication apparatus should perform a combined authentication by a combination of the modalities. The entry condition is thus based on a second condition different from the first condition considered for the single authentication. Here, the example "combined authentication" is construed as performing an authentication through various combinations of modalities, for example, (fingerprint and iris modalities), (fingerprint and face modalities), (iris and face modalities), and (fingerprint, iris, and face modalities), among a plurality of non-limiting example modalities such as the example fingerprint, iris, and face modalities.

Thus, in operation 220, the authentication apparatus determines, with respect to the combination of the modalities, whether to perform the corresponding combined authentication. The authentication apparatus determines whether to perform the combined authentication based on whether the combination of the modalities satisfies the second condition. In this example, the second condition is determined differently for each different combination of such modalities.

The second condition is determined, for example, based on a FAR of a modality having a highest security in the combination of the modalities considered in the combined authentication. For example, in a case in which the combination of the modalities includes an iris modality and a face modality, the second condition is determined based on one ten-millionth, as only an example, which may be a FAR of the iris modality, which has a higher security than the face modality for example. The second condition may require a FAR different from the FAR of one ten-millionth, i.e., as the second condition may be different from a corresponding first condition of the same modality. In an example, in a case in which the combination of the modalities includes a face modality and a fingerprint modality, the second condition may be determined based on one millionth, which may be a non-limiting example FAR of the fingerprint modality, which has a higher security than the face modality for example. The second condition may require a FAR lower than the FAR of one millionth, for example.

The second condition may be determined, for example, based on a FAR of a modality having a highest convenience in the combination of the modalities. For example, in a case in which the combination of the modalities includes a face modality and a signature modality, the second condition may be determined based on one two-thousandth, which is a non-limiting example FAR of the face modality, which has a higher convenience than the signature modality, for example. The second condition may require a FAR different from the FAR of one two-thousandth. A method of the authentication apparatus determining the first condition and the second condition will be described further with reference to FIGS. 3A and 3B.

The combination of the modalities may include, for example, the first modality and a second modality different from the first modality. In another example, the combination of the modalities may include three modalities such as the first modality, the second modality, and a third modality, or the combination may include more than three modalities. The number of modalities included in the combination of the modalities is determined, for example, based on the security or the convenience of the combined authentication, e.g., based on whether the authentication is determined or set to give greater priority for security over convenience or greater priority of convenience over security.

In operation 220, the authentication apparatus determines whether any one or any combination of the first feature of the first modality and a second feature of the second modality satisfies the second condition. In response to the second condition being satisfied, for example, accepted, the authentication apparatus determines to perform the combined authentication by the combination of the modalities. In response to the second condition not being satisfied, for example, having failed, in operation 220, the authentication apparatus may determine that the authentication of the user has failed, in operation 250.

In response to a determination to perform the combined authentication in operation 220, the authentication apparatus performs the combined authentication, in operation 230. In operation 230, the authentication apparatus performs the combined authentication by determining a condition in which a score based on the first feature and a score based on the second feature are combined. For example, the authentication apparatus determines whether a third condition is satisfied, the third condition in which a condition for the score based on the first feature and a condition for the score based on the second feature are combined through a logical operation, for example.

In another example, the authentication apparatus generates a third feature by fusing the first feature and the second feature, e.g., through a logical or mathematical operation, and performs the combined authentication based on the third feature. For example, the authentication apparatus performs the combined authentication based on whether the third feature satisfies a third condition for the combined authentication. The third condition may be determined based on a target FAR for the combined authentication, for example.

In operation 230, the authentication apparatus determines whether a combination of the first feature and the second feature or the third feature satisfies the third condition, for example, using a pre-trained classifier. A method of an authentication apparatus, such as the authentication apparatus of FIG. 2, performing the combined authentication based on the third feature will be described further with reference to FIG. 5.

Figure 3B:
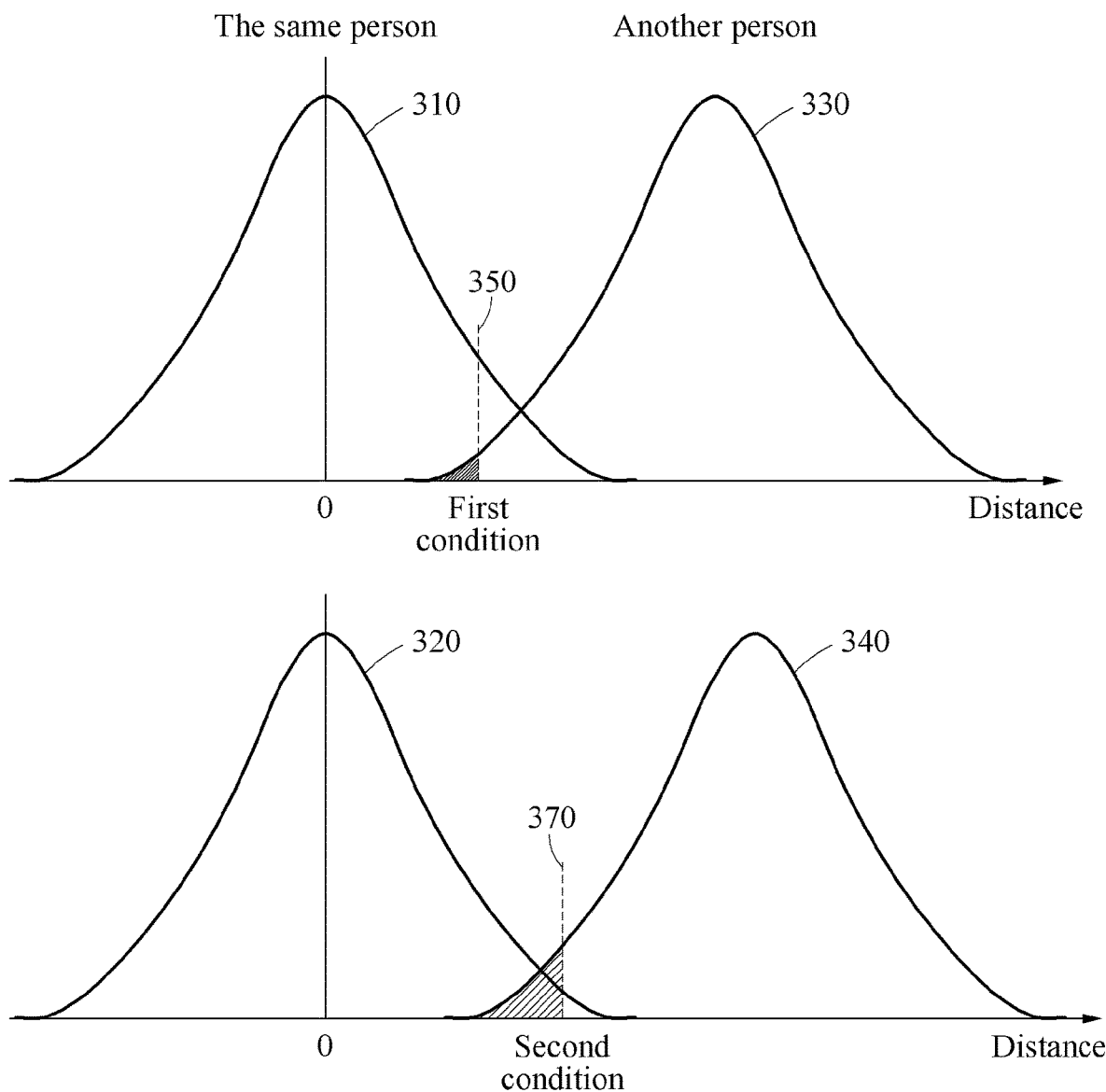

FIGS. 3A and 3B illustrate an example of determining a first condition and a second condition. For example, the first condition corresponds to a threshold distance for performing a single authentication, and a second condition corresponds to a threshold distance used to determine whether to perform a combined authentication. In this example, the threshold distance may be determined based on a verification rate (VR), a FAR, a false rejection rate (FRR), or a combination thereof, as non-limiting examples.

Hereinafter, a method of determining the first condition and the second condition using the FAR will be described for ease of description. However, the method of determining the first condition and the second condition is not limited thereto, and in examples the first condition and the second condition are determined through consideration of various performance indices. Further, although the performance indices to determine the first condition and the second condition are discussed in an example as being the same, target scores to determine respective thresholds corresponding to the first condition and the second condition may be different from each other. For example, the threshold corresponding to the first condition may be determined to satisfy a predetermined FAR for a RAW score, e.g., compared to a score in which additional processing, for example, applied filtering, has been additionally applied. For example, the threshold corresponding to the second condition may be determined to satisfy a predetermined FAR for the score obtained by applying such additional processing, for example, such applied filtering, to the RAW score.

Referring to FIG. 3A, a feature distance by a first feature of a first modality between items of data corresponding to a user, the same person, is represented using a histogram 310. Further, a histogram 330 shows a feature distance by the first feature of the first modality between data corresponding to the user and data corresponding to another person. Here, the feature distance corresponds to a Euclidean distance representing a difference level between a face image of the user and a face image of the other person. The feature distance has a relatively small value when a similarity between data to be compared is relatively high, and has a relatively great value when the similarity between the data to be compared is relatively low.

In an example, an authentication apparatus determines the first condition and the second condition based on various performance indices such as, and as non-limiting examples, a normalized cross correlation (NCC), a matching score, or a similarity score between feature vectors, in addition to the feature distance.

In a graph of FIG. 3A, the axis X represents a feature distance by the feature of the first modality, and the axis Y represents the number of samples corresponding to the feature distance.

The authentication apparatus determines the first condition based on a determination of whether to emphasize security or whether to emphasize convenience, such for accessing or performing a face verification or authentication of a particular application to type of application. For example, in an example where a user executes a financial institution application such as a banking or stock trading application, the authentication apparatus determines the first condition such that a strict authentication is performed by emphasizing security, e.g., emphasizing security over convenience. In an example where the user is attempting to perform a select or limited unlocking of a mobile device, to permit or to perform only a simple function of the mobile device such as a camera or a memo, the authentication apparatus may determine the first condition such that the authentication process is omitted, or such an authentication is performed based on a new criterion by emphasizing convenience, e.g., emphasizing convenience over security. In another example, where the user is attempting to access or perform other operations of the mobile device, e.g., to access personal information or access other operations in addition to such camera and memo applications/functions, the authentication apparatus may determine the first condition such that the authentication is performed based on a new criterion by emphasizing security, e.g., emphasizing security over convenience.

As an example of emphasizing security, the authentication apparatus may set a feature distance of a boundary line 350 as the first condition, where the boundary line 350 distinguishes an area of a level that would allow a misrecognition in an iris modality, for example, the bottom one ten-millionth, of the entire area of the histogram 330 showing a feature distance by a first feature of an iris modality of another person. In this example, in response to the feature distance of the iris modality not satisfying the FAR of one ten-millionth, a single authentication with respect to the user may thus fail.

However, as noted above, the iris modality may not work well in an outdoor environment where there are strong ultraviolet rays, and thus if the iris modality satisfies a predetermined condition, even if the authentication by the iris modality fails, the iris modality may still be used again in the performing of the combined authentication in conjunction with the face modality, for example, which as noted above works well even in an outdoor environment, which may thereby alleviate user inconvenience. For example, in previous approaches where only the iris modality was implemented, the corresponding authentication may have a substantially higher FRR (false recognition rate) in such outdoor environments, and prevent access to a valid user. As an example of the above, if the iris modality does not satisfy a feature distance threshold of the boundary line 350 for the single authentication but satisfies a feature distance threshold of another boundary line 370, the authentication apparatus may determine to perform the combined authentication by a combination of the iris modality and the face modality. The iris modality satisfying the feature distance threshold indicates that a feature distance by the iris modality is less than (or equal to) the feature distance threshold.

In this example, a boundary line for the first condition and a boundary line for the second condition are determined by different score histograms. For example, referring to FIG. 3B, the boundary line 350 for the first condition is set based on the original modality score, for example, the histogram 310 and the histogram 330, and the boundary line 370 for the second condition is set based on a score obtained by applying an additional processing, for example, filtering to the corresponding score, for example, the histogram 320 and the histogram 340.

In an example, if the iris modality satisfies the second condition although the single authentication by the iris modality has failed, the authentication apparatus may configure the iris modality as an element of the combined authentication, that is, a combination of modalities, thereby improving the user convenience while maintaining security. In further detail, in response to the single authentication having failed, by setting an entry condition, for example, the second condition, rather than immediately performing the combined authentication, a rate of misrecognizing another person as one person may be reduced. That is, the combined authentication may be performed only in response to the entry condition, for example, the second condition, being satisfied, and thus, a relatively high security may be maintained when compared to a case of not using the entry condition, for example, the second condition. Further, compared to a case of using the first condition only, a rate of incorrectly excluding one person as another person decreases in examples herein, and thus user convenience may improve over using the first condition only.

Figure 4:
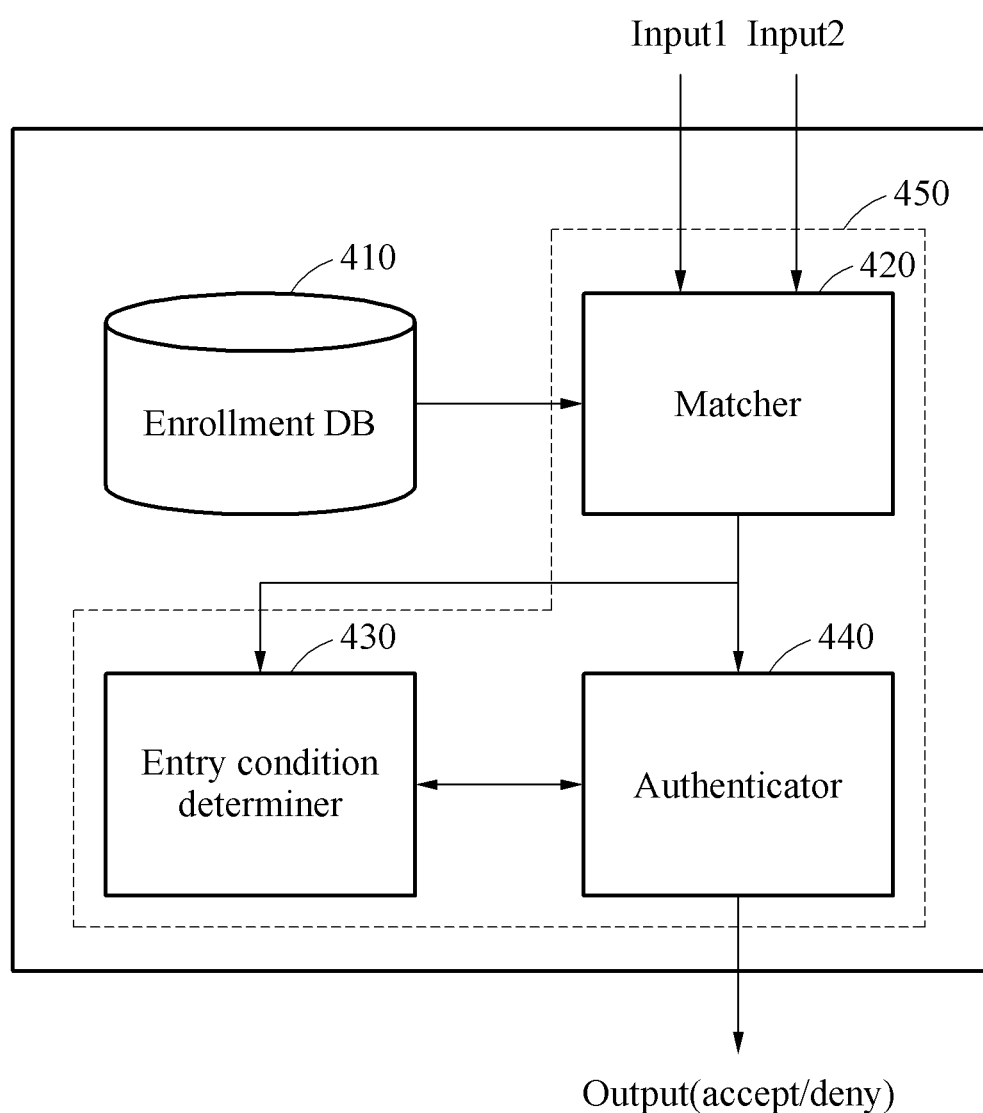
FIG. 4 is a block diagram illustrating an apparatus with selective combined authentication.

FIG. 4 is a block diagram illustrating an apparatus with selective combined authentication, for example. Referring to FIG. 4, an authentication apparatus includes an enrollment database (DB) 410, a matcher 420, an entry condition determiner 430, and an authenticator 440. Operations of the matcher 420, the entry condition determiner 430 and the authenticator 440 may be processor elements or components of processor 450, or respective operations of the same performed by a processor 1510 of FIG. 15, for example, which will be described later.

The enrollment DB 410 includes enrollment feature vectors for each modality. For example, the enrollment DB 410 may be provided for each of modalities or provided as a single unified DB including all the modalities. The enrollment DB 410 may be, or stored in, a memory of the authentication apparatus, and thus, such enrollment feature vectors may be requested and/or accessed from the enrollment DB 410 in the memory.

The matcher 420 my thus request or call in real time, for example, and from the enrollment DB 410, an enrollment feature vector of each of a first modality (Input1) and a second modality (Input2) being input. Here, the input 1 and the input 2 are representative of the respective first and second modality information, e.g., where the input 1 is a color face image and input 2 is an infrared iris image.

The matcher 420 extracts a feature vector of the first modality and/or a feature vector of the second modality, and calculates a feature distance or a similarity score by matching the feature vector of the first modality and/or the feature vector of the second modality with the enrollment feature vectors of the corresponding modalities stored in the enrollment DB 410. In an example, the matcher 420 may extract, in view of an authentication situation of the authenticator 440, the feature vector of the first modality and then extract the feature vector of the second modality as necessary, rather than extracting the feature vectors of the first modality and the second modality at the same time, though in another example the feature vectors may be respectively extracted as the same time.

The matcher 420 transmits the determined feature distance or similarity score corresponding to a matching result of the matcher 420 to the entry condition determiner 430 and the authenticator 440.

For example, in response to the feature distance between the feature vector of the first modality received from the matcher 420 and the enrollment feature vector satisfying a first condition, the authenticator 440 determines that a single authentication is successful and outputs "single authentication success". In response to the single authentication being successful, the authentication apparatus outputs "authentication accept". In response to the feature distance between the feature vector of the first modality and the enrollment feature vector not satisfying the first condition, the authenticator 440 determines that the single authentication has failed and outputs "single authentication failure". The authenticator 440 transmits an authentication result to the entry condition determiner 430.

The entry condition determiner 430 determines whether an entry condition for a combined authentication is satisfied based on the matching result received from the matcher 420, for example, a single authentication success or a single authentication failure. In response to the single authentication failure being received from the matcher 420, the entry condition determiner 430 determines whether the entry condition for the combined authentication is satisfied.

The entry condition determiner 430 then determines whether to perform the combined authentication by a combination of the modalities, based on a second condition different from the first condition for the single authentication. For example, in response to information indicating that a feature distance between at least one of a first feature vector of the first modality and a second feature vector of the second modality and the respective enrollment feature vector of the corresponding modalities stored in a DB satisfies the second condition being received from the matcher 420, the entry condition determiner 430 determines that the entry condition for the combined authentication is satisfied. In response to a determination that the entry condition for the combined authentication is satisfied, the entry condition determiner 430 requests the authenticator 440 to perform the combined authentication by the combination of the modalities. In response to a determination that the entry condition for the combined authentication is not satisfied, the authentication apparatus outputs "authentication failure".

The authenticator 440 performs the combined authentication based on a condition in which a score based on a first feature and a score based on a second feature are combined. In another example, the authenticator 440 generates a third feature by fusing the first feature and the second feature, and performs the combined authentication based on the third feature. The authenticator 440 outputs a result of performing the combined authentication, for example, combined authentication success or combined authentication failure. The authentication apparatus outputs authentication success in response to the combined authentication being successful, and outputs authentication failure in response to the combined authentication having failed. The authenticator 440 performs the combined authentication, for example, by a classifier 500 which will be described later with reference to FIG. 5. A process of the authenticator 440 performing the combined authentication based on the third feature will be described further with reference to FIG. 5.

FIG. 5 illustrates an example of an operation of a classifier that is configured to perform one or more selective combined authentications. Referring to FIG. 5, the classifier 500 may perform a combined authentication based on a third feature generated by fusing a first feature of a first modality and a second feature of a second modality, such as the first feature of the first modality and the second feature of the second modality discussed above with respect to FIG. 4.

For example, in a non-limiting example, 16-dimensional (16D) feature vectors of an iris image and 3-dimensional (3D) feature vectors of a face image may each be input into the classifier 500.

The classifier 500 may then generate 19-dimensional (19D) feature vectors by fusing the 16D feature vectors of an iris modality and the 3D feature vectors of a face modality. In this example, the 16D feature vectors of the iris modality may be feature vectors corresponding to features such as a Hamming distance of an iris, a bit count of the iris, a radius of the iris, a shape and a color of the iris, and morphemes of retinal capillaries, as non-limiting examples. Further, the 3D feature vectors of the face modality may be feature vectors corresponding to features of an entire face or a partial face, also as non-limiting examples.

In this example, the classifier 500 is configured to determine whether the combined authentication has been successful or not, i.e., whether it is accepted or failed, by comparing the 19D feature vectors to a boundary line or a reference value that distinguishes one person from another person. For example, the classifier 500 may be a trained classifier.

A graph on a lower left side of FIG. 5 shows a learning phase of the classifier 500. In the graph showing the learning phase, the axis X represents the example 16D feature space of the example iris image, and the axis Y represents the example 3D feature space of the face image. For ease of description, the 3D feature space of the example face image will be described as an example, and the 16D feature space of the example iris image will be described as an example, noting that respective examples are not limited thereto. For example, in an example, the feature space may be extended to a 20-dimensional (20D) feature space in which a separate axis exists for each dimension, such as by increasing by 1 the dimension of the face image.

In FIG. 5, the illustrated dots in the shown learning phase correspond to the 19D vectors generated by the fusing of the 16D feature vectors and the 3D feature vectors. The boundary line 510 corresponds to a parameter that the classifier 500 ultimately learns for determining whether a combined authentication by the 19D vectors is accepted or failed. The classifier 500 learns the parameter or a corresponding weight with respect to feature vectors, for example, using a support vector machine (SVM). In this example, the parameter that the classifier 500 learns is determined based on a level of a target FAR of the authentication apparatus, though examples are not limited thereto.

A graph on a lower right side of FIG. 5 shows an authentication phase of the classifier 500. In the authentication phase, the boundary line 530 corresponds to a parameter of the classifier 500. The line 530 corresponds to a simplified two-dimensional (2D) representation of the 19D feature vectors. For example, in response to the fused 19D feature vectors being generated, the authentication apparatus may perform a combined authentication with respect to the 19D inputs based on the boundary line 530. For example, the authentication apparatus may determine a first input ($I_1$, $F_1$) on the left side of the boundary line 530, e.g., below the boundary line 530, to be authentication accept, and determine a second input ($I_2$, $F_2$) on the right side of the boundary line 530, e.g., above the boundary line 530, to be authentication fail.

Figure 6A:
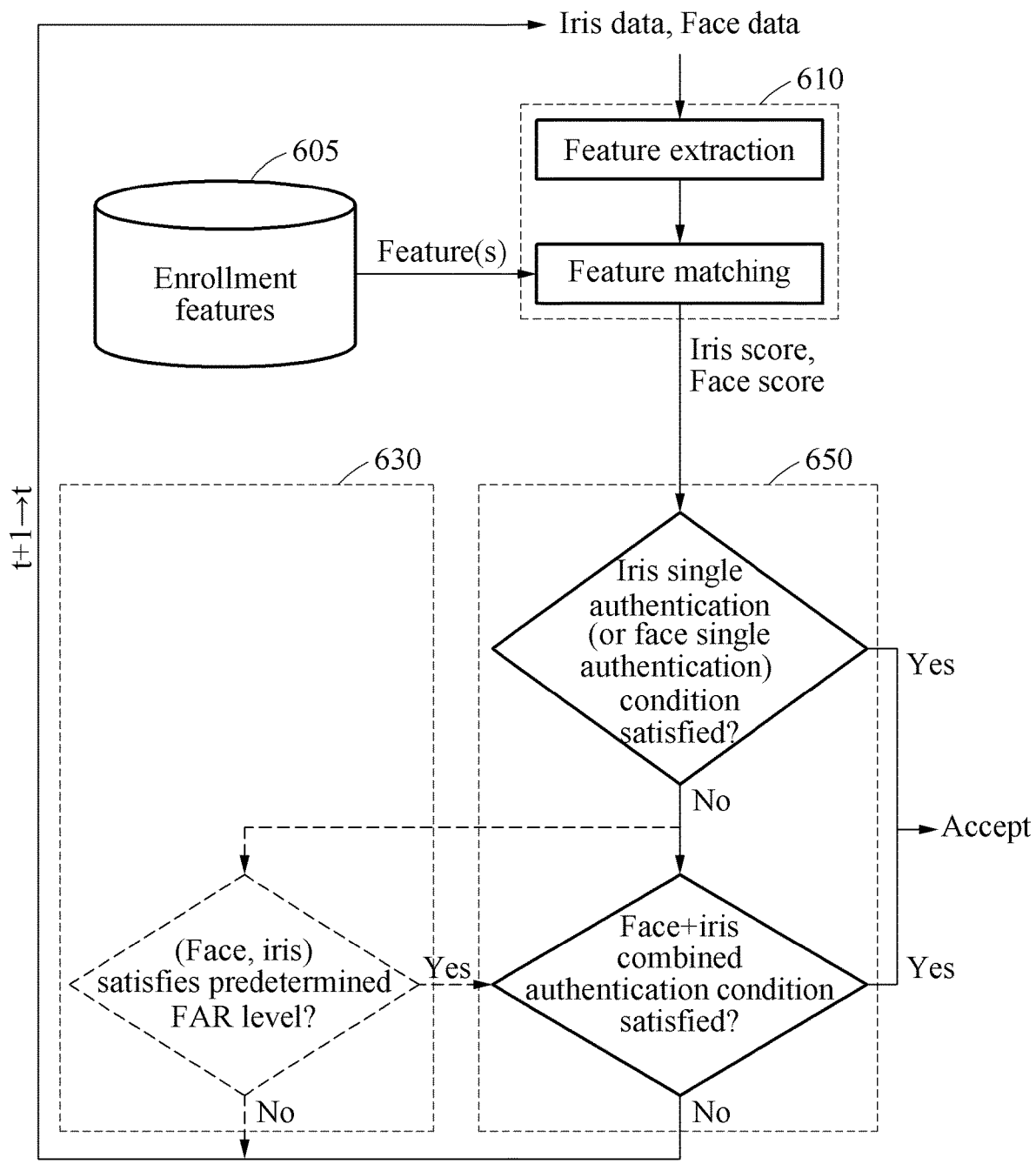
FIGS. 6A, 6B, and 7 through 11 are flowcharts illustrating examples of methods with selective combined authentication.

FIG. 6A is a flowchart illustrating an example of a method with selective combined authentication. Referring to FIG. 6A, a process with selective combined authentication with respect to iris data corresponding to a first modality and face data corresponding to a second modality is illustrated.

An authentication apparatus performs the combined authentication through operation 610 of extracting feature information of a modality, and operation 650. The authentication apparatus further performs operation 630 of determining whether to perform the combined authentication based on a security level. In an example, operations 630 and 650 are performed in order, while in another example the operations 630 and 650 are performed out of order.

In operation 610, in response to the iris data and the face data being input, e.g., in response to the iris data and the face data being respectively captured by respective cameras of the authentication apparatus or requested or received from such respective cameras, or stored to and read from memories or buffers in which such data may temporarily be stored, the authentication apparatus extracts a feature vector with respect to each of modalities. The authentication apparatus calculates an iris score or a face score by performing a matching or similarity determination operation between the extracted feature vectors with enrollment feature vectors for each corresponding modality stored in an enrollment DB 605. In this example, the iris score or the face score corresponds to a feature distance or a similarity score between the feature vector extracted from each of the modalities and the enrollment feature vector.

In operation 650, the authentication apparatus determines whether one of the iris score or the face score satisfies a single authentication condition. For example, in one circumstance the authentication apparatus determines whether the iris score satisfies a corresponding single authentication condition, while in another circumstance the authentication apparatus determines whether the face score satisfies a corresponding single authentication score. In response to the single authentication condition being satisfied, the authentication apparatus accepts an authentication.

In response to the either of the example iris score or the face score not satisfying the corresponding single authentication condition, the authentication apparatus determines whether a face score and/or an iris score satisfies a predetermined FAR based on a set security level, in operation 630.

In detail, whether the face score separately satisfies the predetermined FAR, whether the iris score separately satisfies the predetermined FAR, or whether both the face score and the iris score satisfy the predetermined FAR may be used to determine whether the predetermined FAR is satisfied.

The predetermined FAR is determined to be a FAR for authentication of the face data or a FAR for authentication of the iris data, based on the set security level. In response to the combined modality score, e.g., based on the resultant face modality score and iris modality score, or respectively both resultant face and iris modality scores, not satisfying the predetermined FAR in operation 630, the authentication apparatus acquires new iris data and/or face data and performs the combined authentication process of FIG. 6A again.

In response to (face score, iris score) satisfying the predetermined FAR in operation 630, the authentication apparatus determines whether a combination of the iris score and the face score, or a fusion score calculated by fusing the iris score and the face score, satisfies a combined authentication condition, in operation 650. In response to the combined authentication condition being satisfied, the authentication apparatus accepts the authentication.

In response to the combined authentication condition not being satisfied, the authentication apparatus acquires new iris data and face data and performs the combined authentication process of FIG. 6A again.

In an example, in response to the condition being not satisfied in operations 630 or 650, the authentication apparatus may determine that the authentication has failed by counting a predetermined number of times that the illustrated t of FIG. 6A is incremented, or the number of times either or both of the iris and face data are required, or determine that the authentication has failed upon a predetermined length of time since a beginning of the authentication operation having expired, for example. For example, in response to the condition not being satisfied in operation 630 or 650, the authentication apparatus accumulates and stores the number of authentication failures resulting in the combined authentication process being performed again. In response to the cumulative number of failures exceeding a predetermined threshold, the authentication apparatus may determine that the authentication has failed. In another example, the authentication apparatus accumulates and monitors the amount of time used or having expired for the combined authentication processes or entire authentication process, and may determine that the authentication has failed in response to the cumulative monitored time exceeding a predetermined threshold. For example, in response to the condition not being satisfied in operation 630 or 650, the authentication apparatus determines whether the cumulative monitored time exceeds the predetermined threshold. In an example, in response to a determination that the authentication has failed, the authentication apparatus may provide a user with a feedback indicating authentication failure, where such feedback may be express or inherent, such as through express feedback that provides display, haptic, or audible feedback of failure (or success) or inherent feedback where the user does not gain access to an application or use of a device, or does not gain access to a secure location, etc., noting that inherent success may similarly be indicated through merely the user being given access to such an application or use of the device, etc.

Figure 6B:
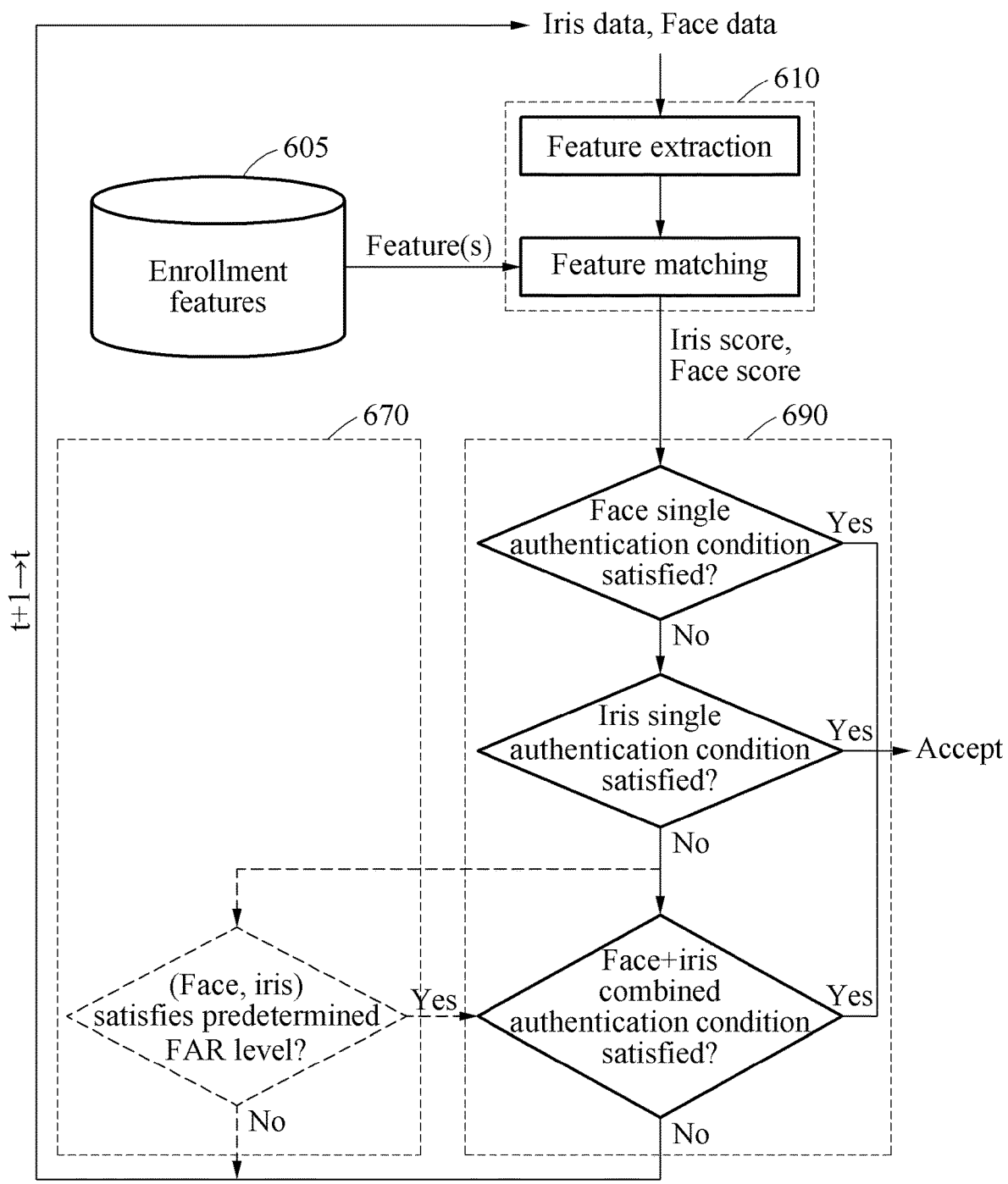

FIG. 6B is a flowchart illustrating an example of a method with selective combined authentication. Referring to FIG. 6B, the authentication apparatus extracts feature information of a modality, in operation 610. The authentication apparatus sequentially performs a single authentication and then selectively a combined authentication, in operation 690. For example, the authentication apparatus may firstly perform a face single authentication, selectively secondarily perform an iris single authentication, and selectively thirdly performs face and iris modalities combined authentication. In response to the either of the single authentications or the combined authentication being successful in each operation, the authentication apparatus may immediately determine that the authentication is successful, e.g., without performing any remaining authentication(s).

In response to both the face single authentication and the iris single authentication having respectively failed, the authentication apparatus determines an entry condition related to whether to perform the combined authentication, prior to performing the combined authentication.

In response to the entry condition or another condition for the combined authentication not being satisfied, the authentication apparatus may repeat both the face and iris single authentication processes based on new respective input data, e.g., through respective recapturings of such respective face and iris biometric information or through accessing of stored face and/or iris biometric information subsequent to the already input data, such as where the respective cameras of the authentication apparatus captures multiple frames. In a case in which authentication is still not successful after the predetermined number of times that such new data is considered has been exceeded or after predetermined time has elapsed since the beginning of the authentication operation, the authentication apparatus may finally determine that the authentication has failed.

Figure 7:
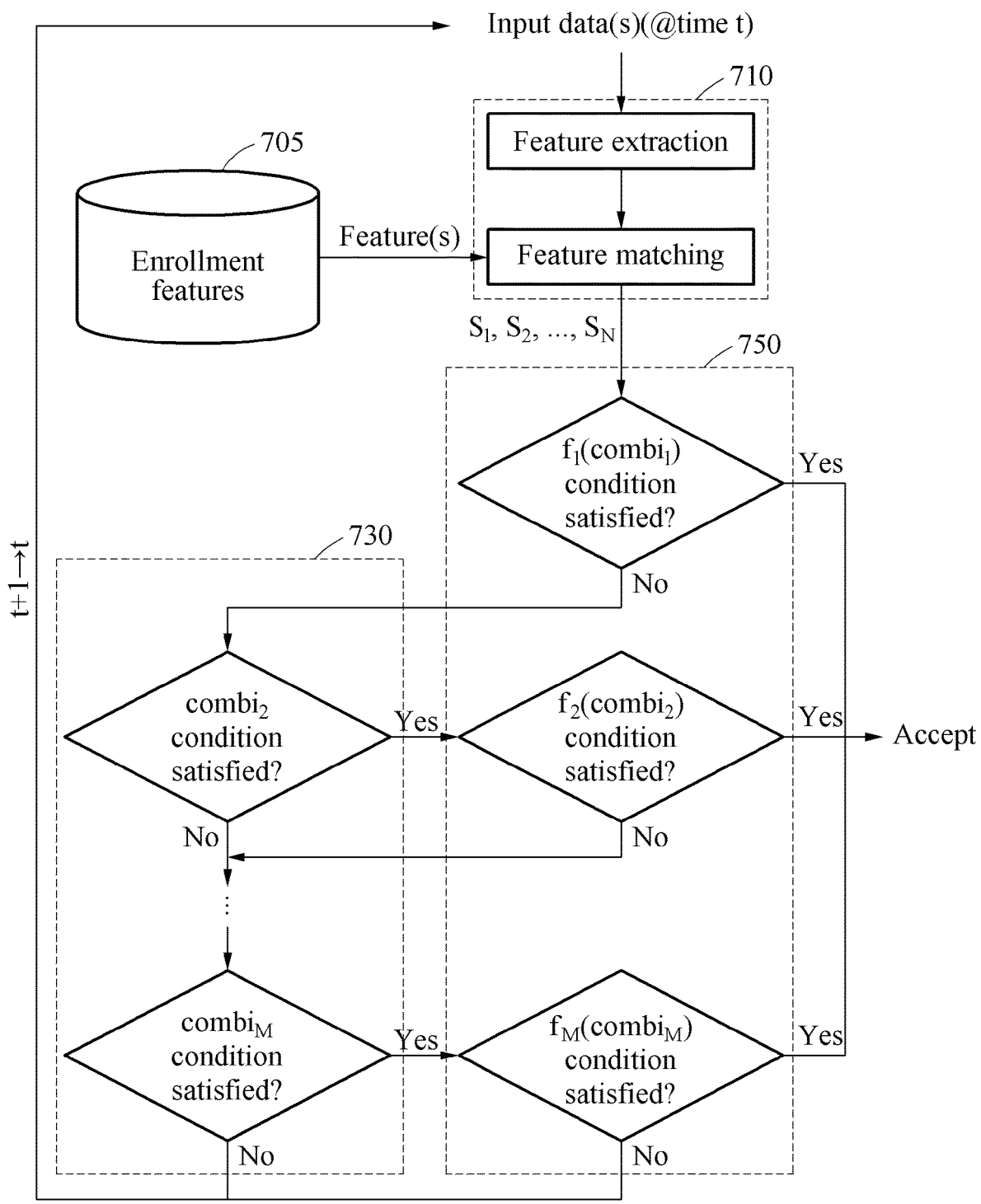

FIG. 7 is a flowchart illustrating an example of a method with selective combined authentication. Referring to FIG. 7, a combined authentication process that improves a user convenience and enhances a security at the same time is illustrated.

As non-limiting examples, operations 610 through 650 of FIG. 6A include determining whether features or feature vectors corresponding to any one modality match, e.g., within a predetermined similarity threshold, corresponding registered features or feature vectors with respect to that one modality, and if a result of that determining indicates that recognition fails, there may be a further determination of whether features or feature vectors corresponding to any one combination of modalities, for example, a combination of a face modality and an iris modality, satisfy a condition for entering a combined authentication and/or whether fused feature vectors satisfy a condition for an acceptance of the combined authentication, and based on that further determination the combined authentication may be selectively performed. Operations 710 through 750 of FIG. 7 include determining whether a "combi condition" and a "f(combi) condition" are satisfied with respect to various combinations of modalities. Hereinafter, for ease of description, the condition for entering the combined authentication will be denoted as "combi condition", and the condition for the acceptance of the combined authentication of fused feature vectors will be denoted as "f(combi) condition". Due to modalities being different the combi condition and/or the f(combi) condition are determined differently for each combination of the corresponding different modalities.

In FIG. 7, depending on whether a security level of the combined authentication through each combination of the modalities is set to be exceedingly high, or the security level set for the combined authentication is set to not be high, one or more condition determinations with respect to various authentication methods may be added or omitted for each combination of the modalities in various such examples.

In response to data of many modalities being controlled to be input, e.g., as a result of controlled capturing of the corresponding biometric information, an authentication apparatus performs an authentication by various selective combinations of the modalities. For example, as demonstrated in FIG. 7, the authentication apparatus may perform the combined authentication up to M authentication methods including respective various combinations of at least one of N modalities. Thus, M denotes the number of authentication methods by a single authentication, two or more single authentications, the one or more single authentications and one or more combined authentications, or merely such one or more combined authentications.

However, prior to performing the combined authentication by each combination of the modalities, the authentication apparatus determines whether to perform the combined authentication based on whether scores $s_1, s_2, \ldots, s_N$ for the modalities satisfy the f(combi) condition and/or the combi condition. The f(combi) condition and/or the combi condition are, for example, greater than or equal to, less than or equal to, less than, greater than a predetermined score, or a form of a combination thereof. In this example, the scores $s_1, s_2, \ldots, s_N$ for the modalities may correspond to feature distances or similarity scores between feature vectors corresponding to the modalities and enrollment feature vectors for the modalities stored in an enrollment DB 705, as non-limiting examples. A condition with respect to the scores for the modalities may, thus, be used as an entry condition to determine whether to enter the combined authentication.

The authentication apparatus may perform the combined authentication for each combination of corresponding modalities in response to each of the scores for the modalities being input, e.g., rather than performing an authentication after all the scores of the N modalities for the combined authentication are input completely. In an example, the authentication apparatus may determine a criterion to determine whether to enter the combined authentication based on a modality having a predetermined excellent security, i.e., a modality which has been predetermined to provide a greatest or great security level compared to other modalities.

In operation 750, the authentication apparatus may determine whether a fused score of a combination of first modalities satisfies a $f_1(combi_1)$ condition based on the scores $s_1, s_2, \ldots, s_N$ for the modalities. In this example, the combination of the first modalities corresponds to a single modality, or a combination of at least two modalities. Further, the $f_1(combi_1)$ condition corresponds to a single authentication condition in a case in which the combination of the first modalities includes a single modality, and corresponds to a combined authentication condition in a case in which the combination of the first modalities includes at least two modalities.

In response to the fused score of the combination of the first modalities not satisfying the $f_1(combi_1)$ condition, the authentication apparatus determines whether scores corresponding to a combination of second modalities satisfy a $combi_2$ condition and/or whether fused feature vectors corresponding to the combination of the second modalities satisfy a $f_2(combi_2)$ condition. As described above, examples include such processes of determining a corresponding combi condition and corresponding f(combi) condition with respect to various authentication methods, based on a predetermined security level of the authentication, being added for each added combination of modalities based on the predetermined security level. As another example, in a case in which the security level of the combined authentication is predetermined to be low or a demand for the convenience is predetermined high, examples include such processes of determining the corresponding combi condition and corresponding f(combi) condition with respect to the various authentication methods being added or omitted for each combination of modalities based on such predetermined low security level or high convenience.

Figure 8:
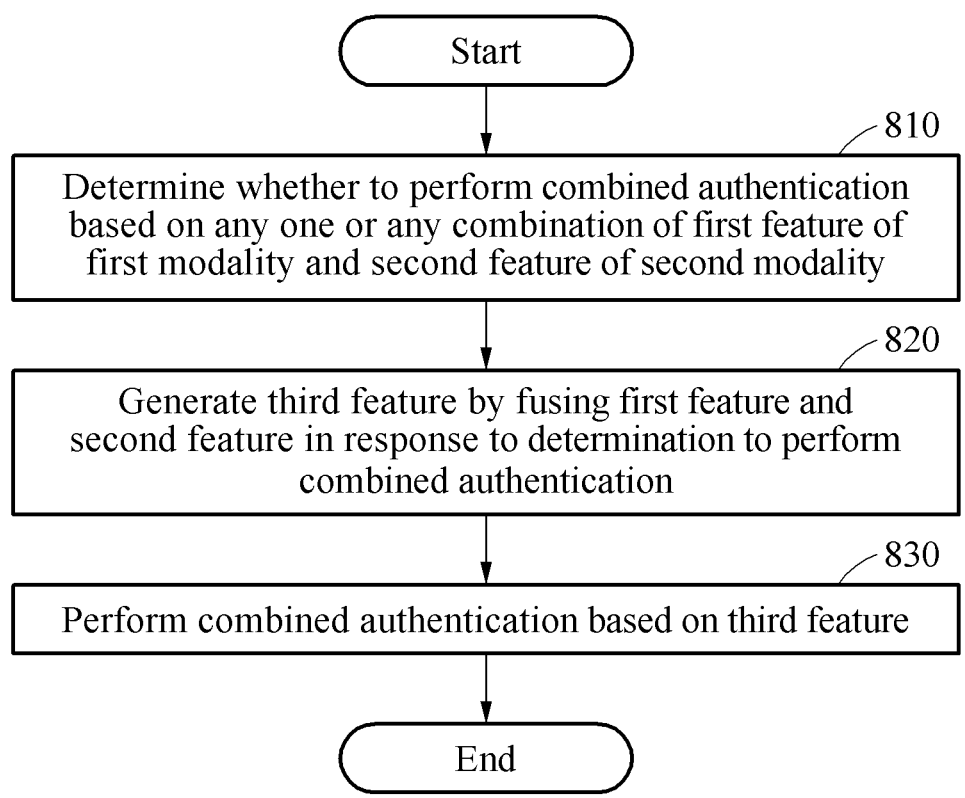

FIG. 8 is a flowchart illustrating an example of a method with selective combined authentication. Referring to FIG. 8, in operation 810, an authentication apparatus determines whether to perform a combined authentication based on any one or any combination of a first feature of a first modality and a second feature of a second modality, for example. The authentication apparatus determines, for example, whether the first feature satisfies a first condition for a single authentication. In response to the first feature not satisfying the first condition, the authentication apparatus determines whether any one or any combination of the first feature and the second feature satisfies a second condition different from the first condition. In response to the second condition being satisfied, the authentication apparatus determines to perform the combined authentication by a combination of the first modality and the second modality. The second condition is determined, for example, based on a FAR of the first modality or the second modality.

In operation 820, the authentication apparatus generates a third feature by fusing the first feature and the second feature in response to a determination to perform the combined authentication.

In operation 830, the authentication apparatus performs the combined authentication based on the third feature. In response to the third feature satisfying a third condition for the combined authentication, the authentication apparatus performs the combined authentication.

Figure 9:
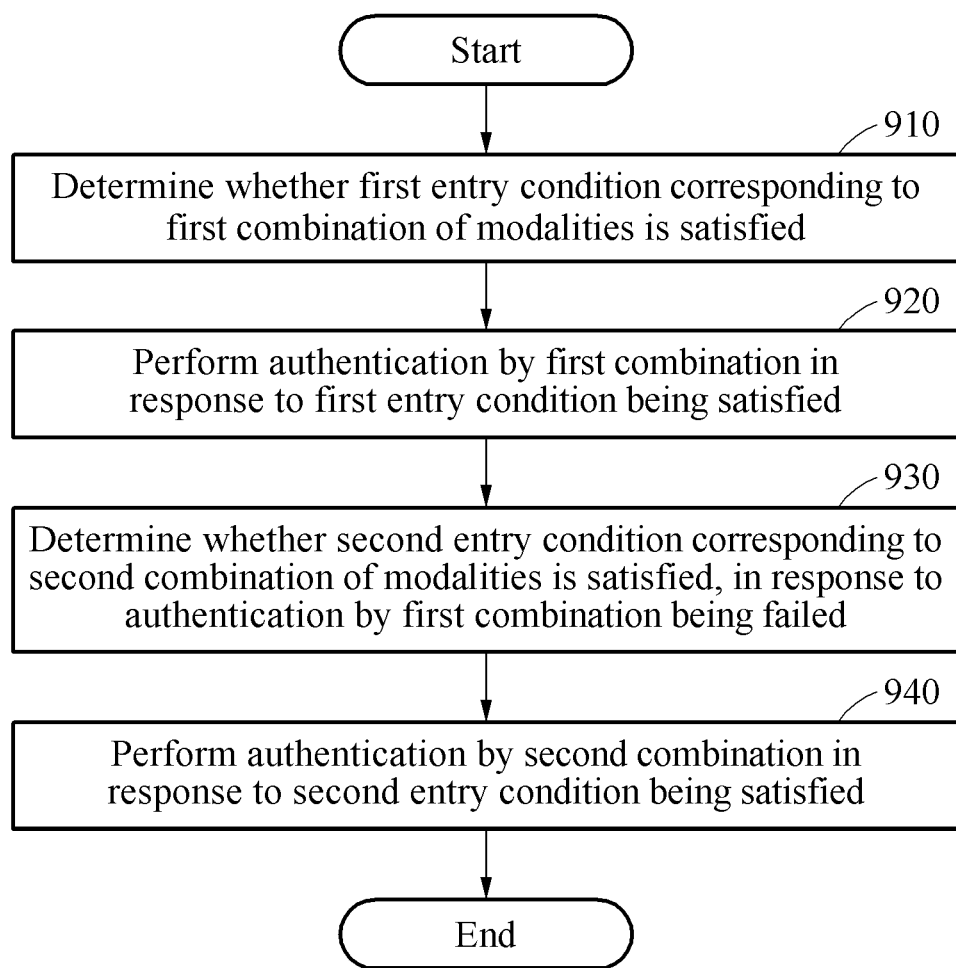

FIG. 9 is a flowchart illustrating an example of a method with selective combined authentication. Referring to FIG. 9, in operation 910, an authentication apparatus determines whether a first entry condition corresponding to a first combination of modalities is satisfied. For example, the authentication apparatus determines whether the first entry condition is satisfied based on whether the first combination of the modalities satisfies a second condition different from a first condition for a single authentication. The first combination of the modalities includes a first modality and a second modality different from the first modality. The authentication apparatus determines whether any one or any combination of a first feature of the first modality and a second feature of the second modality satisfies the second condition. In response to any one or any combination of the first feature and the second feature satisfying the second condition, the authentication apparatus determines that the first entry condition is satisfied.

In operation 920, the authentication apparatus performs an authentication by the first combination in response to the first entry condition being satisfied.

In operation 940, the authentication apparatus determines whether a second entry condition corresponding to a second combination of the modalities is satisfied in response to the authentication by the first combination being failed. In this example, the first entry condition and the second entry condition are determined differently for each combination of the modalities.

In operation 940, the authentication apparatus performs an authentication by the second combination in response to the second entry condition being satisfied.

Figure 10:
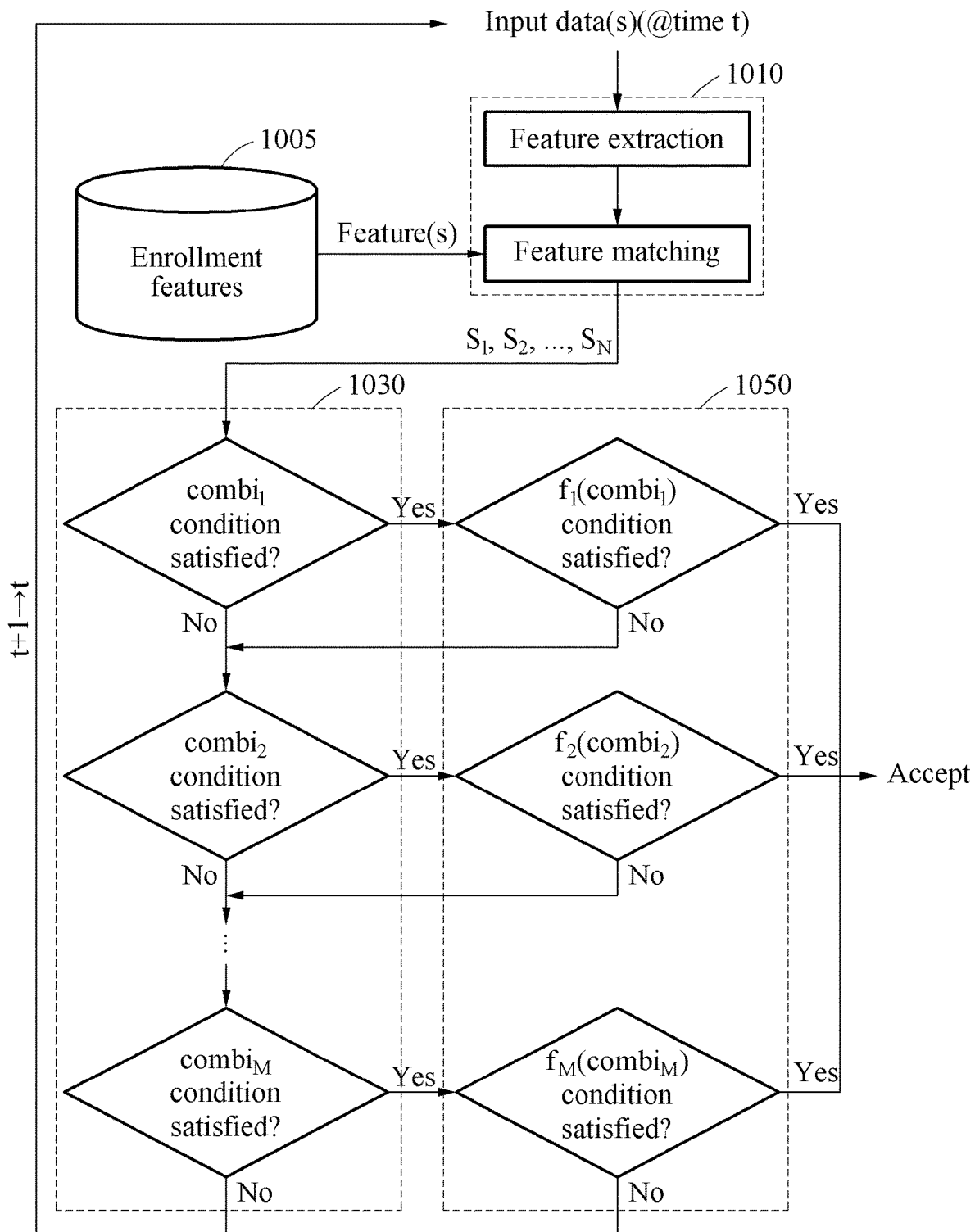

FIG. 10 is a flowchart illustrating an example of a method with selective combined authentication. Referring to FIG. 10, a combined authentication process is illustrated. Operations 1010 through 1050 of FIG. 10 may be considered similar to operations 710 through 750 of FIG. 7, for example, with some differences from those of FIG. 7.

For example, unlike FIG. 7, in response to data of many modalities being input, an authentication apparatus determines whether a combination of first modalities satisfies a $combi_1$ condition based on scores $s_1, s_2, \ldots, s_N$ for the modalities, in operation 1030. In response to the combination of the first modalities not satisfying the $combi_1$ condition, the authentication apparatus determines whether a combination of second modalities satisfies a $combi_2$ condition. In response to each of the combinations of the modalities not satisfying the combi condition, the authentication apparatus continues a comparison of a combination of new modalities with the combi condition until the combi condition is satisfied.

For example, in a case of $combi_I$ condition=$(M_1, M_2, M_3)$ in operation 1030, an entry condition corresponding to the $combi_I$ combination is determined, for example, by an $M_1$ condition, an $M_2$ condition, an $M_3$ condition, or various combinations thereof.

In response to the combination of the first modalities satisfying the $combi_1$ condition, the authentication apparatus determines whether a fused score of the combination of the first modalities satisfies a $f(combi_1)$ condition, in operation 1050. In this example, a score for each modality is used to determine whether to enter a combined authentication. In response to the fused score of the combination of the first modalities not satisfying the $f(combi_1)$ condition, the authentication apparatus determines whether the combination of the second modalities satisfies a $combi_2$ condition. In response to the fused score of the combination of the first modalities satisfying the $f(combi_1)$ condition, the authentication apparatus accepts the combined authentication.

Figure 11:
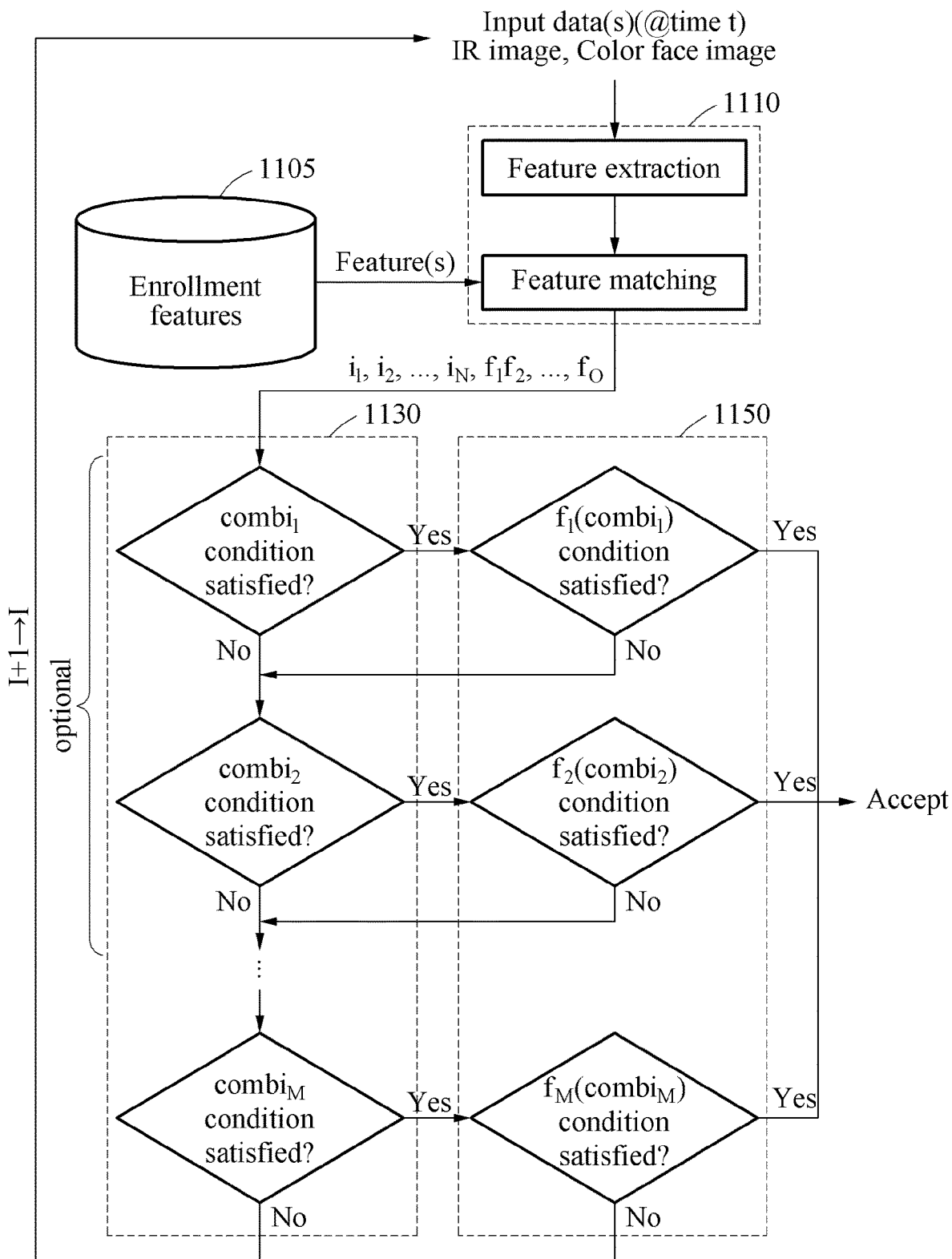

FIG. 11 is a flowchart illustrating an example of a method with selective combined authentication. Referring to FIG. 11, a process of controlling an IR camera and a color camera to capture an IR image and a color face image, e.g., controlling an input of the IR image and the color face image to the authentication apparatus, and performing a combined authentication using the IR image and the color face image is illustrated. For ease of description, an application using a color image will be described. However, examples are not limited to such a scenario, and are also substantially similarly or identically applicable to an application using a monochrome image or a depth image or 3D image, as non-limiting examples.

The authentication apparatus matches a plurality of features or feature vectors of an iris modality obtained from the IR image and a plurality of features or feature vectors corresponding to a face modality obtained from the color face image through a feature extraction process of operation 1110 with enrollment feature vectors for modalities enrolled in an enrollment DB. The authentication apparatus calculates scores $i_1, i_2, \ldots, i_N$ corresponding to the plurality of features of the iris modality and scores $f_1, f_2, \ldots, f_O$ corresponding to the plurality of features of the face modalities through operation 1110. In this example, the plurality of features of the iris modality include a Hamming distance of an iris, a bit count of the iris, a radius of the iris, a shape and a color of the iris, and morphemes of retinal capillaries. Further, the plurality of features corresponding to the face modality include a partial face and an entire face, and may include features from each of the partial face and the entire face.

In operation 1130, the authentication apparatus determines whether a combination of first modalities satisfies a $combi_1$ condition based on the scores $i_1, i_2, \ldots, i_N$, and $f_1, f_2, \ldots, f_O$ for the modalities. The combination of the first modalities is, for example, a combination of the Hamming distance of the iris and the partial face. In response to the combination of the first modalities not satisfying the $combi_1$ condition, the authentication apparatus determines whether a new combination of second modalities satisfies a $combi_2$ condition. The combination of the second modalities is, for example, a combination of the morphemes of retinal capillaries and the entire face.

In response to the combination of the second modalities satisfying the $combi_2$ condition, the authentication apparatus determines a fused score of the combination of the second modalities satisfies a $f_2(combi_2)$ condition. In response to the fused score of the combination of the second modalities satisfying the $f_2(combi_2)$ condition, the authentication apparatus accepts a combined authentication by the combination of the second modalities.

In an example, the authentication apparatus may selectively control the combi condition to be always true or to be always false for some situations. For example, while the authentication apparatus may be configured to perform the determination of the combi condition, the authentication apparatus may selectively control the $combi_1$ condition corresponding to a face score $f_1$ among scores corresponding to the face modality to be always true, thereby always performing a single authentication of a face score, irrespective of whether the $combi_1$ condition would otherwise have been satisfied with respect to the face score $f_1$. In another example, the authentication apparatus may selectively control the $combi_1$ condition corresponding to the face score $f_1$ to be always false, thereby skipping the single authentication of the face score, irrespective of whether the $combi_1$ condition would otherwise have been satisfied.

Further, in addition to the above examples, the authentication apparatus may perform an authentication considering both user convenience and security by combining the combi condition and the f(combi) condition in various manners. For example, f(combi) conditions may be set to perform single authentication(s) based on individual features and combined authentication(s) may be based on a combination of a plurality of features in a predetermined order. A combi condition corresponding to each f(combi) condition is set based on a condition different from a single authentication condition used for the f(combi) condition. Also, as noted above, in some cases, the combi condition may be controlled to be true or false irrespective of whether the corresponding combi condition would otherwise have resulted in the true or false determination.

Figure 12:
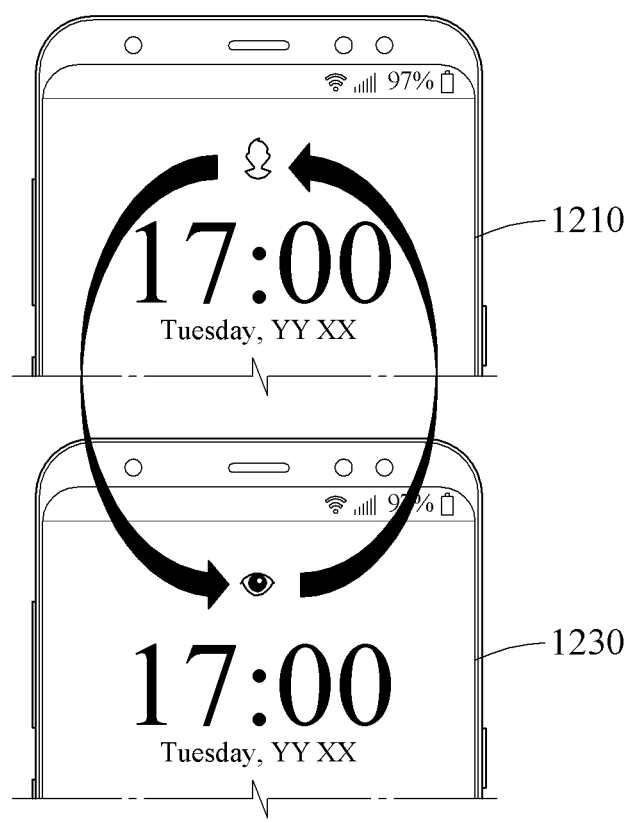
FIG. 12 illustrates an example of a user interface.

FIG. 12 illustrates an example of a user interface, e.g., a mobile device including the user interface. Referring to FIG. 12, when a user uses a biometric authentication, a type of a modality that is being, or is going to be, used to unlock a smart phone is displayed on a lock screen of the smart phone. For example, in a case in which the modality that is being, or is going to be, used to unlock the smart phone is a face modality, a face icon is displayed on the lock screen, as shown in a first screen 1210. In a case in which the modality that is being, or is going to be, used to unlock the smart phone is an iris modality, an iris icon is displayed on the lock screen, as shown in a second screen 1230. In a case in which the modality that is being, or is going to be, used to unlock the smart phone is a combination of the face modality and the iris modality, the face icon of the first screen 1210 and the iris icon of the second screen 1230 are both displayed or alternately displayed on the lock screen.

In an example, a first preview screen for inputting a face image and a second preview screen for inputting an iris image may additionally be selectively displayed, though examples exist where such preview screens are not displayed. The preview screens for inputting the face image or the iris image may be feedback images of the user guiding the user to position their face or their eyes in certain positions relative to the cameras, as non-limiting examples. Whether to display the first preview screen and whether to display the second preview screen may be set in various manners. For example, in a case of using a single authentication of the face modality, the first preview screen may be controlled to not be displayed. However, in a case of using a single authentication of the iris modality, the second preview screen may be controlled to be displayed. Further, in a case of using a combined authentication of the face modality and the iris modality, both the first preview screen and the second preview screen may be controlled to not be displayed, both may be controlled to be displayed, or only the second preview screen may be controlled to be displayed.

Although FIG. 12 illustrates the face modality and the iris modality, examples exist where other modalities, such as a fingerprint modality, are additionally or alternatively implemented, i.e., alternatively to either or both of the face image and the iris image modalities, such as for the example unlocking operation, noting that the example of FIG. 12 is not limited to only such an unlocking operation.

Figure 13A:
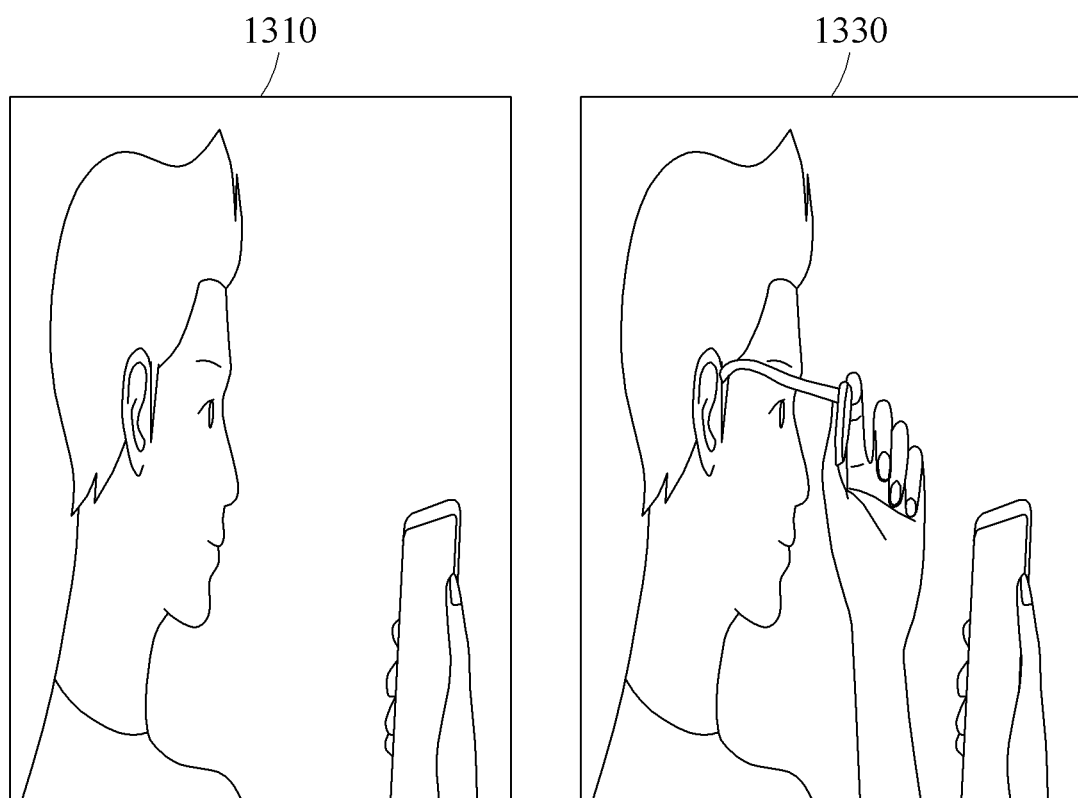

FIGS. 13A and 13B illustrate an example of a biometrics registration process. Referring to FIG. 13A, in operation 1310, a user registers a face image using an image sensor of or attached to a smart phone. In operation 1330, the user registers an iris image using an IR sensor of or attached to the smart phone. If the user is determined to be wearing glasses or merely as a reminder to the user, the operation 1330 may include requesting the user take off the glasses to register the iris image.

In an example, the user may select the type(s) of a modality to be used for an authentication for various predetermined applications or functions. Thus, for example, the user may change the type of the user modality, e.g., from a default or previous setting, to be used to unlock the smart phone in settings of the smart phone.

Referring to FIG. 13B, a screen for selecting a type of a modality to be used for a biometric authentication is illustrated. For example, options to be selected include a first option 1370 corresponding to a single authentication using a face modality, a second option 1390 corresponding to a single authentication using an iris modality, and a third option 1350 corresponding to a combined authentication using a combination of the face modality and the iris modality. In response to the first option 1370 being selected, the face modality is used for the biometric authentication. In response to the second option 1390 being selected, the iris modality is used for the biometric authentication. In response to the third option 1350 being selected, both the face modality and the iris modality are used for the biometric authentication. The first option 1370, the second option 1390, and the third option 1350 are selected exclusively from each other. For example, in response to any one option being selected, an option selected before is automatically cancelled. As another example, such different options may be representative of offering the user to select between options of varying user convenience and security.

In an example, the third option 1350 corresponding to the combined authentication may not be displayed as a separate selectable option, but rather, the user may select this third option by the first option 1370 and the second option 1390 being selected concurrently. In a case in which the first option 1370 and the second option 1390 are selected concurrently, the combined authentication using the combination of the face modality and the iris modality is performed for the biometric authentication.

Although a case of using the face modality and the iris modality for the biometric authentication is described in FIG. 13B, examples are not limited thereto. Various examples exist with additional or alternative modalities. For example, the user may be provided with selectable options for at least three modalities, such as in various selectable combinations of face, iris, fingerprint, vein, etc., modalities.

In response to the type of the modality being set, the authentication apparatus verifies whether enrollment data corresponding to the type of the modality is stored. In response to verification that the enrollment data corresponding to the type of the modality is stored, the authentication apparatus changes the type of the modality for the authentication immediately without performing an additional registration process. If the enrollment data corresponding to the type of the modality is not stored, the authentication apparatus requests the user prepare for the capturing of the corresponding enrollment data, and that enrollment data corresponding to the type of the modality is captured and stored as registration data.

In an example, the combined authentication of the face modality and the iris modality may be set by the user in a situation in which pre-stored enrollment data for the same is absent. In this example, the authentication apparatus captures or acquires a face image and an iris image, extracts respective features or feature vectors from the captured or acquired face image and iris image, and respectively stores the same as enrollment data of the face modality and enrollment data of the iris modality.

In another example, the combined authentication of the face modality and the iris modality may be set by the user in a situation in which only enrollment data of the face modality is already stored. In this example, the authentication apparatus captures or acquires an iris image only, extracts features or feature vectors from the captured or acquired iris image, and stores the extracted features or feature vectors as enrollment data of the iris modality.

In a case in which the user changes such settings from the combined authentication of the face modality and the iris modality to the single authentication of the iris modality, the authentication apparatus may determine whether enrollment data of the iris modality is stored. In this example, since the enrollment data of the iris modality is already stored, the authentication apparatus changes the settings to use the single authentication of the iris modality without performing an additional registration process.

In an example, enrollment data may be managed for each modality. For example, the user may selectively delete enrollment data of a predetermined modality among the pre-stored enrollment data, such as where selectable options for each of the modalities is displayed and the user may select one or more of such options to control the deletions of the corresponding enrollment data. In this example, after such a deletion of a select one or more enrollment data for corresponding one or more modalities, the authentication apparatus changes an authentication type based on a currently set authentication type and the remaining enrollment data. For example, enrollment data of the face modality and enrollment data of the iris modality may be already stored, and the currently set authentication type may be a combined authentication. If the enrollment data of the iris modality is deleted, the authentication apparatus may automatically change the authentication type to the single authentication of the face modality. In another example, when all the enrollment data of biometric modalities are deleted, the authentication type may be automatically changed to a type of performing an authentication through another process, such as a pattern or a password entry based on user set pattern and password.

While the above examples are discussed with respect to mobile devices, e.g., a smart phone or tablet, these examples are also representative of other devices other than such a smart phone or tablet, and also applicable to modalities other than the face modality and/or the iris modality.

Figure 14:
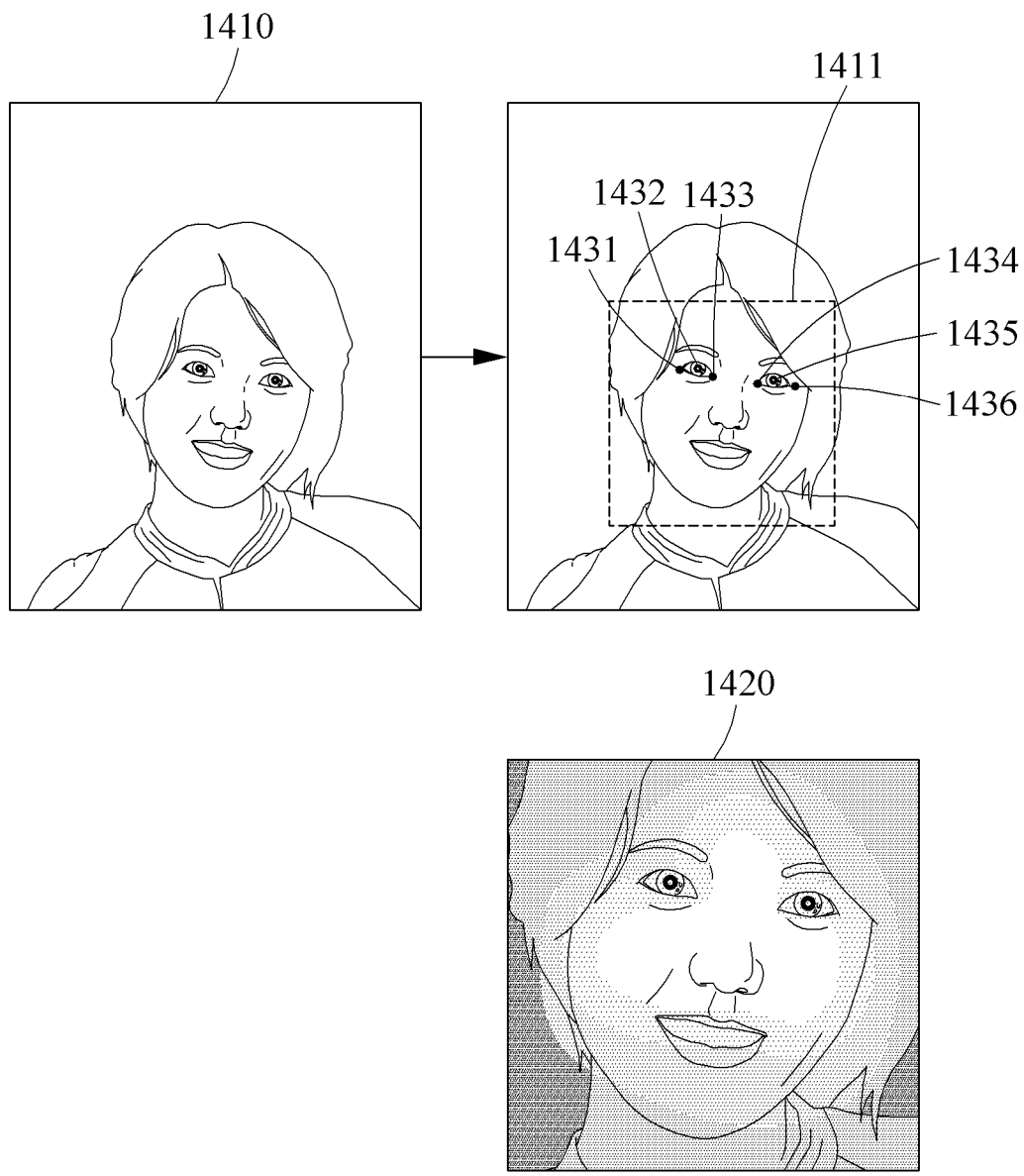
FIG. 14 illustrates an example with selective combined authentication by utilizing a correlation between different modalities.

FIG. 14 illustrates an example of performing a selective combined authentication by utilizing a correlation between different modalities. In this example, the authentication apparatus may utilize a determined correlation between a first image and a second image, for example, in a process of acquiring a first image for a first modality and a second image for a second modality.

For example, in an example where the first modality is a face modality and the second modality is an iris modality, an eye region in the first image may be expected by the authentication apparatus to have a relatively high correlation with the second image. In this example, in response to a single authentication using the first image having failed, the authentication apparatus may determine whether the eye region is detected in the first image, and use the result of that eye region detection determination to determine whether to perform a single authentication using the second image or a combined authentication using the first image and the second image. In detail, in the authentication apparatus, a configured angle of view of an image sensor for the first image may be greater than a configured angle of view of an IR sensor for the second image. In this example, if an eye region is not detected from the first image, there may be a high probability of the second image not including iris information. When iris information is not included in the second image, it may be impossible to perform the single authentication using the second image or the combined authentication. Thus, the authentication apparatus may control a recapturing or reacquiring of the first image, instead of acquiring the second image, thereby retrying the single authentication using the newly captured or acquired first image.

Although the above example was explained using a discussion of the first image being a color image 1410 and the second image being an IR image 1420, as illustrated in FIG. 14, examples are not limited thereto. In an example, the first image may be the IR image and the second image may be the color image, or both the first image and the second image may be IR images, or both the first image and the second image may be color images. In another example, the first image may be a depth image and the second image may be a color image. Thus, as non-limiting examples, the first image may be one of a color image, an IR image, and a depth image, and the second image may also be one of a color image, an IR image, and a depth image.

The authentication apparatus captures or acquires the color image 1410 as the first image. For example, the first image sensor of the authentication apparatus generates the color image 1410 by capturing a face of a person as an object, as shown in FIG. 14.

In response to a single authentication using the color image 1410 having failed, the authentication apparatus identifies a landmark point of the object with respect to the color image 1410. For example, the authentication apparatus extracts a facial feature point of the person from the color image 1410 based on an object model. In an example, the authentication apparatus checks whether a landmark point is identified within a predetermined region 1411. Example landmark points are represented as respective dots (1431, 1432, 1433, 1434, 1435, and 1436) in FIG. 14. In this example, landmark points 1431, 1433, 1434, and 1436 may correspond to the respective lateral extents of the eyes, and landmarks 1432 and 1435 may correspond to the respective pupils of the eyes, as non-limiting examples. The predetermined region 1411 of the color image 1410 may be a region having extents defined by an angle of view of the IR image 1420, and thus the region 1411 may correspond to the angle of the view of the IR image 1420. In a case in which a landmark is not detected in the predetermined region 1411 of the color image 1410, the authentication apparatus predicts that iris information is not included in the IR image 1420. The landmark may include any of various facial landmarks, such as the aforementioned example elements of the eye(s), as well as respective elements of eye brows, nose, mouth, jawline, etc., as non-limiting examples.

Figure 15:
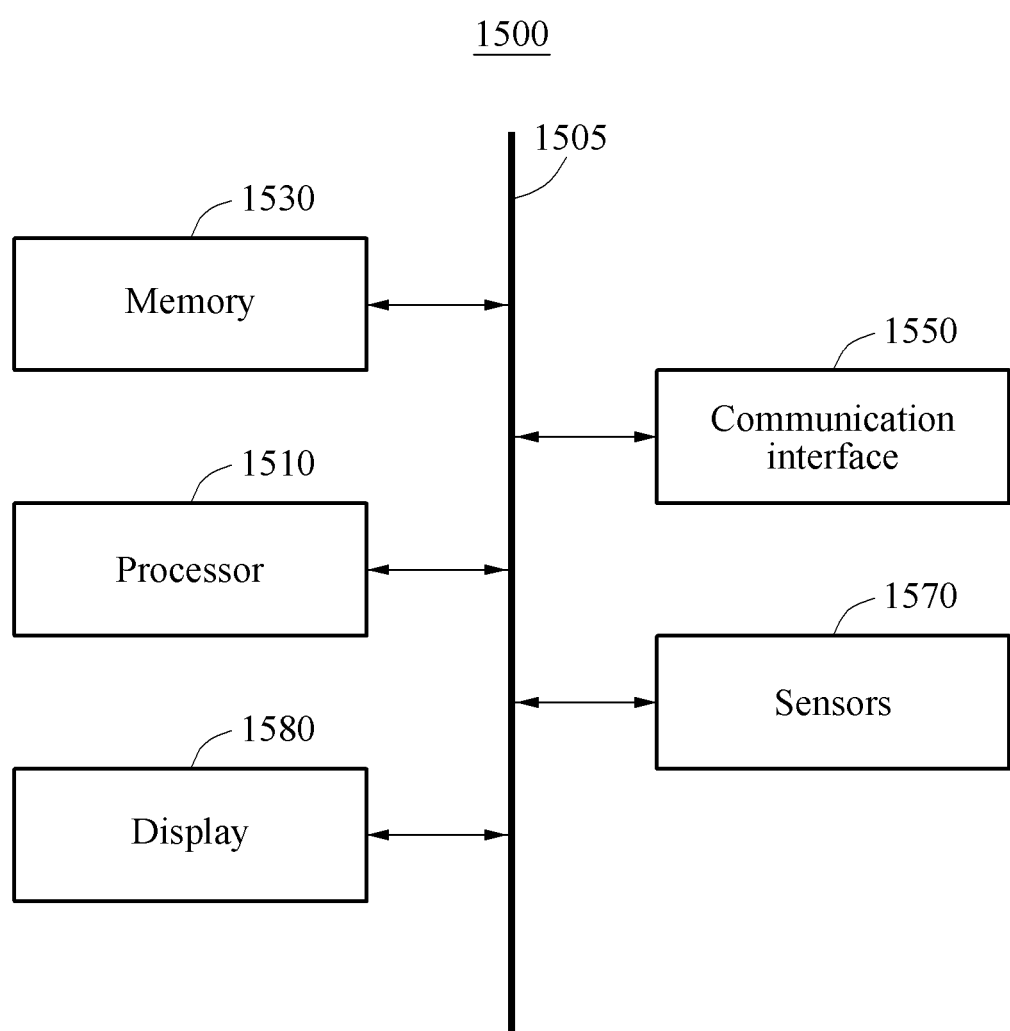
FIG. 15 is a block diagram illustrating an example of an apparatus with a combined authentication.

FIG. 15 is a block diagram illustrating an example of an authentication apparatus with selective combined authentication. Referring to FIG. 15, an authentication apparatus 1500 includes the processor 1510. The authentication apparatus 1500 further includes a memory 1530, a communication interface 1550, and sensors 1570. The processor 1510, the memory 1530, the communication interface 1550, and the sensors 1570 communicate with each other through a communication bus 1505.

The processor 1510 performs a single authentication based on a first modality among multiple modalities. In response to the single authentication having failed, the processor 1510 determines whether to perform a combined authentication by a combination of some or all of the modalities based on a second condition different from a first condition for the single authentication. The processor 1510 performs the combined authentication in response to a determination to perform the combined authentication. The processor may thus be configured to perform any one, any combination, or all operations described above with respect to FIGS. 1-14.

The memory 1530 includes an enrollment DB containing registration feature vectors, for example, for the respective modalities, and may further store fusion registration feature vectors as registered fused feature vectors corresponding to the aforementioned fusion examples. The enrollment DB may correspond to, for example, the enrollment DB 410 of FIG. 4. The memory 1530 may be a volatile memory or a non-volatile memory.

The communication interface 1550 may indicate a single authentication result and/or a combined authentication result, such as by controlling an express display of the success (and/or failure) of the authentication on a display device 1580 of the authentication apparatus 1500 or a remote display outside of the authentication apparatus 1500. As noted above, the indication may also be inherent, such as through the authentication apparatus 1500 unlocking the display, or providing access to additional functions of an application, for indications of success, or the prevention of such unlocking or success for authentication failures The communication interface 1550 may also transmit the success or failure to another device, such as for secure entry to a secure area. The communication interface 1550 may also receive one or more modalities from outside of the authentication apparatus 1500, and/or receive information related to an environment in which a modality is collected from a user.

The sensors 1570 include, for example, an image sensor, an IR sensor, a fingerprint recognition sensor, and a voice recognition sensor. The sensors collect various modalities. In addition, the sensors may include an environmental sensor that may capture and provide information on the environment in which one or more modalities are collected, such as an ambient light level sensor.

In an example, the processor 1510 determines whether to perform the combined authentication based on any one or any combination of a first feature of the first modality and a second feature of a second modality. The processor 1510 generates a third feature by fusing the first feature and the second feature in response to the determination to perform the combined authentication, and performs the combined authentication based on the third feature.

In another example, the processor 1510 determines whether a first entry condition corresponding to a first combination of the modalities is satisfied, and performs an authentication by the first combination in response to the first entry condition being satisfied. In response to the authentication by the first combination being failed, the processor 1510 determines whether a second entry condition corresponding to a second combination of the modalities is satisfied, and performs an authentication by the second combination in response to the second entry condition being satisfied.

In addition, the processor 1510 may be configured to perform one or more or all operations described with reference to FIGS. 1 through 14 by execution of instructions, e.g., a program or computer readable code, stored in the memory 1530. In an example, the authentication apparatus 1500 is connected to an external device, for example, a personal computer or a network, through the communication interface 1550, and thereby exchanges data with the external device, which may include the aforementioned example one or more modalities. The authentication apparatus 1500 may be a smart television, a smart phone, a smart vehicle, and various electronic systems, as non-limiting examples.

The authentication apparatuses, the processors, the enrollment DB memory, the matcher 420, authenticator 440, the entry condition determiner 430, the processor 450, the authentication apparatus 1500, the processor 1510, the memory 1530, the bus 1505, the communication interface 1550, the sensors 1570, and the display 1580 and any other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with respect to FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented authentication method, the method comprising:
    performing a single authentication of a first feature of a user by a first modality, among plural modalities, to determine whether the first feature satisfies a first condition determinative of success or failure of the single authentication, the first modality corresponding to a first biometric information of the user, the first feature being extracted from data sensed by first modality sensor at a single timing;
    when the single authentication of the user has failed, determining whether to perform a combined authentication of the user, based on whether the first feature satisfies an entry condition prior to performing the combined authentication of the user for each combination of the plural modalities; and
    selectively, depending on a result of the determining whether to perform the combined authentication of the user:
    extracting a second feature of the user by a second modality corresponding to a combination of two or more of the plural modalities, the second modality corresponding to a second biometric information of the user different from the first biometric information, the second feature being extracted from data sensed by second modality sensor at a single timing;
    generating a third feature of the user by fusing the first feature extracted by the first modality and the second feature of the user extracted by the second modality; and
    performing the combined authentication of the user using the third feature to determine whether the third feature satisfies a third condition determinative of success or failure of the combined authentication,
    wherein the entry condition and the first condition are determined based on a first feature space of the first feature,
    wherein a threshold of the entry condition is less strict than a threshold of the first condition, and
    wherein the third condition is determined corresponding to a third feature space of the third feature, the third feature corresponds to a fusion of the first feature and the second feature.

2. The method of claim 1, wherein the first modality is an iris image modality.

3. The method of claim 1, wherein the second modality is a combination of two or more of a face, a fingerprint, an iris, a vein, a palmprint, a signature, a voice, a gait, and a DNA structure modality.

4. The method of claim 1, wherein the combined authentication is applied to a payment application.

5. A non-transitory computer-readable storage medium storing instructions that, when executed by a processor, cause the processor to perform the control method of claim 1.

6. A processor-implemented authentication method, the method comprising:
    performing a first single authentication of a first feature of a user by a first modality, among plural modalities, to determine whether the first feature satisfies a first condition determinative of success or failure of the first single authentication, the first modality corresponding to a first biometric information of the user, the first feature being extracted from data sensed by first modality sensor at a single timing;
    performing a second single authentication of a second feature of the user by a second modality, among the plural modalities, based on whether the second feature satisfies a second condition determinative of success or failure of the second single authentication, the second modality corresponding to a second biometric information of the user different from the first biometric information, the second feature being extracted from data sensed by second modality sensor at a single timing;

determining whether to perform a combined authentication of the user, if both of the first single authentication and the second single authentication, which have been performed, are determined to be a failure, based on whether the first feature satisfies an entry condition, prior to performing the combined authentication of the user for each combination of the plural modalities;

selectively, depending on a result of the determining whether to perform the combined authentication of the user, generating a third feature of the user by a third modality corresponding to a combination of two or more of the plural modalities by fusing the first feature extracted by the first modality and the second feature of the user extracted by the second modality; and performing the combined authentication of the user based on the third feature used to determine whether the third feature satisfies a third condition determinative of success or failure of the combined authentication, wherein the entry condition and the first condition is determined based on a first feature space of the first feature, wherein a threshold of the entry condition is less strict than a threshold of the first condition, and wherein the third condition is determined corresponding to a third feature space of the third feature, the third feature corresponds to a fusion of the first feature and the second feature.

7. The method of claim 6, wherein the first modality is a face image modality and
wherein the second modality is an iris image modality.

8. The method of claim 6, wherein the third modality is a combination of two or more of a face image modality, a fingerprint image modality, an iris image modality, a vein image modality, a palmprint image modality, a signature modality, a voice modality, a gait modality, and a DNA structure modality.

9. The method of claim 6, wherein the combined authentication is applied to an unlock function of a smart phone.

10. A non-transitory computer-readable storage medium storing instructions that, when executed by a processor, cause the processor to perform the control method of claim 6.

11. A processor-implemented authentication method, the method comprising:

performing a single authentication of a first feature of a user by a first modality, among plural modalities, to determine whether the first feature satisfies a first condition determinative of success or failure of the single authentication, the first modality corresponding to a first biometric information of the user, the first feature being extracted from data sensed by first modality sensor at a single timing;

when the single authentication of the user has failed, determining whether to perform a combined authentication of the user, based on whether an eye region is detected in a first image of the first modality, which is determined based on whether the first feature satisfies an entry condition, prior to performing the combined authentication of the user for each combination of the plural modalities; and selectively, depending on a result of the determining whether to perform the combined authentication of the user, extracting a second feature of the user by a second modality corresponding to a combination of two or more of the plural modalities, the second modality corresponding to a second biometric information of the user different from the first biometric information, the second feature being extracted from data sensed by second modality sensor at a single timing;

generating a third feature of the user by fusing the first feature extracted by the first modality and the second feature of the user extracted by the second modality; and performing the combined authentication of the user based on the third feature to determine whether the third feature satisfies a third condition determinative of success or failure of the combined authentication, wherein the entry condition and the first condition is determined based on a first feature space of the first feature, wherein a threshold of the entry condition is less strict than a threshold of the first condition, and wherein the third condition is determined corresponding to a third feature space of the third feature, the third feature corresponds to a fusion of the first feature and the second feature.

12. The method of claim 11, wherein the first modality is a face image modality.

13. The method of claim 11, wherein the second modality is a combination of two or more of a face image modality, a fingerprint image modality, an iris image modality, a vein image modality, a palmprint image modality, a signature modality, a voice modality, a gait modality, and a DNA structure modality.

14. The method of claim 11, wherein the first image is a face image.

15. The method of claim 11, wherein the first image comprises a color image, an IR image, or a depth image.

16. The method of claim 11, wherein the second image comprises a color image, an IR image, or a depth image.

17. A non-transitory computer-readable storage medium storing instructions that, when executed by a processor, cause the processor to perform the control method of claim 11.

* * * * *